US009690804B2

(12) United States Patent
Masuko et al.

(10) Patent No.: US 9,690,804 B2
(45) Date of Patent: Jun. 27, 2017

(54) INFORMATION PROCESSING DEVICE, INFORMATION PROCESSING METHOD, INFORMATION PROCESSING PROGRAM, AND RECORDING MEDIUM

(75) Inventors: Soh Masuko, Tokyo (JP); Hajime Masuda, Tokyo (JP); Shigaku Iwabuchi, Tsukuba (JP)

(73) Assignee: Rakuten, Inc., Tokyo (JP)

(*) Notice: Subject to any disclaimer, the term of this patent is extended or adjusted under 35 U.S.C. 154(b) by 0 days.

(21) Appl. No.: 13/696,441

(22) PCT Filed: May 30, 2011

(86) PCT No.: PCT/JP2011/062366
§ 371 (c)(1),
(2), (4) Date: Nov. 21, 2012

(87) PCT Pub. No.: WO2011/149104
PCT Pub. Date: Dec. 1, 2011

(65) Prior Publication Data
US 2013/0066906 A1    Mar. 14, 2013

(30) Foreign Application Priority Data

May 28, 2010    (JP) ................................ 2010-123191
Jun. 25, 2010    (JP) ................................ 2010-145065

(51) Int. Cl.
*G06F 17/30*          (2006.01)
(52) U.S. Cl.
CPC ............................. *G06F 17/30241* (2013.01)
(58) Field of Classification Search
CPC .. G06F 3/0237; G06F 12/0246; G06F 17/276; G06F 3/04883; G06F 3/0236;
(Continued)

(56) References Cited

U.S. PATENT DOCUMENTS

2004/0205671 A1* 10/2004 Sukehiro ............. G06F 17/2735
                                                                   715/259
2008/0033652 A1* 2/2008 Hensley et al. .................. 702/5
(Continued)

FOREIGN PATENT DOCUMENTS

JP    2005-063249 A    3/2005
JP    2010-198281 A    9/2010

OTHER PUBLICATIONS

Chikara Hashimoto et al., "Construction of Domain Dictionary for Fundamental Vocabulary and its Application to Automatic Blog Categorization with the Dynamic Estimation of Unknown Words' Domains", Journal of Natural Language Processing, Oct. 10, 2008, pp. 73-97, vol. 15, No. 5.

(Continued)

*Primary Examiner* — Jay Morrison
*Assistant Examiner* — Ken Hoang
(74) *Attorney, Agent, or Firm* — Sughrue Mion, PLLC

(57) ABSTRACT

The invention acquires article data (S1), extracts characteristic words from the acquired article data (S2), specifies a characteristic word which is not stored as a local area word in a database 12*b* which stores a local area word indicating a local area in association with geography information for specifying the local area, from the extracted characteristic words (S3), acquires a result of searching performed in a search device, according to the specified characteristic word (S4 and S5), specifies a local area related to article data based on the search result and finds geography information (S6), and stores the specified characteristic word in the database 12*b* as the local area word in association with the specified local area (S7).

10 Claims, 29 Drawing Sheets

(58) Field of Classification Search
CPC ...... G06F 12/02; G06F 1/1626; G06F 1/1662;
G06F 12/00; G06F 12/0284; G06F
12/0804; G06F 12/0842; G06F 12/128;
G06F 17/28
USPC .......... 711/103, E12.008, E12.002, E12.001,
711/E12.078, 170, E12.017, E12.026,
711/E12.092, E12.098, E12.103, 117,
711/118, 125, 133, 141, 149, 154, 162,
711/163, 203, 209; 707/E17.014,
707/E17.018, E17.032, 693, 722, 758,
707/769, 780, 827; 704/9; 714/758,
714/E11.03, E11.034, 752
See application file for complete search history.

(56) References Cited

U.S. PATENT DOCUMENTS

| | | | |
|---|---|---|---|
| 2008/0154873 A1* | 6/2008 | Redlich | G06F 17/30864 |
| 2009/0019085 A1 | 1/2009 | Abhyanker | |
| 2010/0328316 A1* | 12/2010 | Stroila et al. | 345/441 |
| 2011/0167001 A1* | 7/2011 | Stephens et al. | 705/44 |
| 2012/0084323 A1* | 4/2012 | Epshtein et al. | 707/776 |
| 2012/0212756 A1* | 8/2012 | Chiba | H04N 1/00244 358/1.11 |

OTHER PUBLICATIONS

Hyakubun wa Ikken ni Shikazu—Anata no Shiranai Saishin Site e Taikan! Web2.0, Nikkei Personal Computing, Nov. 27, 2006, pp. 56-61, No. 518.

Masayuki Kodama et al., "An Implementation of a NewsML Management System using Meta Data", 2006 Nendo Annual Conference of JSAI (Dai 20 Kai) Ronbunshu [CD-ROM], Jun. 9, 2006, pp. 1-4.

International Search Report of PCT/JP2011/062366 dated Jun. 28, 2011.

* cited by examiner

| LAND MARK | LONGITUDE/LATITUDE | ADDRESS |
|---|---|---|
| ○○ TREE | x1, Y1 | ..... |
| ○ LAND | ..., ... | ..... |
| △ TOWER | ..., ... | ..... |
| MT. △△ | ..., ... | ..... |
| ..... | ..., ... | ..... |

FIG.3A

| PREFECTURAL AND CITY GOVERNMENTS | LONGITUDE/ LATITUDE |
|---|---|
| HOKKAIDO | ..., ... |
| AOMORI | ..., ... |
| TOKYO | ..., ... |
| ..... | ..., ... |

FIG.3B

| LOCAL GOVERNMENT | LONGITUDE/LATITUDE ASSOCIATED WITH LOCAL GOVERNMENTS |
|---|---|
| ○ VILLAGE | ..., ... |
| △ TOWN | ..., ... |
| ▽ CITY | ..., ... |
| ... | ... |
| ○○ WARD | ..., ... |
| ..... | ..., ... |

FIG.3C

| POSTAL CODE | LONGITUDE/LATITUDE ASSOCIATED WITH POSTAL CODES |
|---|---|
| 060-xxxx | ..., ... |
| ..... | ..., ... |
| ..... | ..., ... |
| ..... | ..., ... |
| ..... | ..., ... |

FIG.3D

| ADDRESS | LONGITUDE/LATITUDE ASSOCIATED WITH ADDRESS |
|---|---|
| ○▽CITY○TOWN△△1-2-3 | ..., ... |
| ..... | ..., ... |
| ..... | ..., ... |
| ⋮ | ⋮ |
| ..... | ..., ... |
| ..... | ..., ... |

FIG.3E

| WORD | FIRST RELEVANT WORD | SECOND RELEVANT WORD | THIRD RELEVANT WORD | . . . |
|---|---|---|---|---|
| ○○TREE | △△△△ | ○▽○ | ○○ | |
| ○○ | ×××× | | | |
| △△△△ | ××× | ▽▽WARD | | |
| ○▽○ | ・・・・・ | ・・・・・ | | |
| ・・・・・ | ・・・・・ | | | |

| GEOGRAPHY CODE | CATEGORY | ARTICLE CONTENT | COUNT |
|---|---|---|---|
| 0000001 | SPORT | BASEBALL | 5 |
| 0000001 | SPORT | SOCCER | 3 |
| ... | ... | ... | ... |
| 0000002 | SPORT | BASEBALL | 0 |
| 0000002 | SPORT | SOCCER | 0 |
| ... | ... | ... | ... |

FIG.11

[PARAGRAPH A]　△TOWER・・・・・・・、ANTENNA AT TOP OF △TOWER、
・・・・・・・・△○PREFECTURE・△▽PREFECTURE・・・・・。・・・・・・
・・・・・・・・・・・。・・・・・・・・・。

【段落B】・・・・▽○PREFECTUREから・・・・○▽CITYの・・・・・・・
・・・・・△TOWER・・・・・。FURTHER、・・・・・・・・・・・・・
・・・△TOWER・・・・・・・・・・。

FIG.17

▲▲SINAGAWA WHICH OPENED ON 30 THIS MONTH・・MR.●●●●・・・
・・・・IN SHINAGAWA WARD XXX・・・・・・・・・・。・・・・▼▼▼STORE・・
・・・・・・・・・・。・・・・・・・・・。

FIG.18

| ARTICLE ID | GEOGRAPHY CODE | TIME INFORMATION | GROUP NUMBER |
|---|---|---|---|
| ····· | 0000001 | 2010/03/04/-00 : 15 | 001 |
| ····· | 0000002 | 2010/03/04-10 : 00 | 001 |
| ····· | 0000001 | 2010/03/04-19 : 45 | 001 |
| ····· | 0000101 | 2010/03/05-07 : 55 | 002 |
| ····· | 0000100 | 2010/03/05-16 : 00 | 002 |
| ····· | 0000102 | 2010/03/06-12 : 03 | 002 |
| ····· | 0000101 | 2010/03/06-14 : 08 | 002 |
| ····· | 0000101 | 2010/03/07-18 : 15 | 002 |
| ····· | 0001003 | 2010/03/15-06 : 11 | 003 |
| ····· | 0001001 | 2010/03/15-08 : 30 | 003 |
| ····· | 0001002 | 2010/03/15-12 : 59 | 003 |
| ····· | 0001001 | 2010/03/15-17 : 02 | 003 |
| ····· | 0002103 | 2010/03/20-08 : 11 | 005 |
| ····· | 0002105 | 2010/03/20-11 : 30 | 005 |

FIG.24

INFORMATION PROCESSING DEVICE, INFORMATION PROCESSING METHOD, INFORMATION PROCESSING PROGRAM, AND RECORDING MEDIUM

CROSS REFERENCE TO RELATED APPLICATIONS

This application is a National Stage of International Application No. PCT/JP2011/062366 filed May 30, 2011, claiming priority based on Japanese Patent Application Nos. 2010-123191 filed May 28, 2010 and JP 2010-145065 filed Jun. 25, 2010, the contents of all of which are incorporated herein by reference in their entirety.

TECHNICAL FIELD

The invention relates to a technical field of an information processing device, an information processing method, an information processing program, and a recording medium which process information on Internet.

BACKGROUND ART

As use of Internet expands, various techniques are being developed which organize a great amount of information on Internet, and intelligibly display information for users. For example, Patent Document 1 discloses a classification result display device which displays, in time series, clustering results which enable a relationship between clusters, a relationship between document and a cluster, and a relationship between document to be easily comprehended, and which enable transition of a trend of a document group to be analyzed.

CITATION LIST

Patent Document

Patent Document 1: Japanese Patent Application Laid-Open No. 2005-63249

SUMMARY OF THE INVENTION

Problem to be Solved by the Invention

However, although the above technique classifies information based on clusters, in case of information which newly appears in, for example, a news article, information is highly likely to be isolated from clusters, and therefore it is difficult to indicate a relevance between newly appearing information and another information. In case of a new landmark such as a newly built building in particular, a database for a name of a place does not usually exist, and therefore users need to, for example, search in and check another website to find the relevance as to in which area the new landmark is.

The invention is made in light of the problem, and object of the invention is to provide an information processing device, an information processing method, an information processing program, and a recording medium which can specify a local area even from a word which appears in an article and does not exist in a database.

Means for Solving the Problem

In order to solve the above problem, an aspect of the invention includes: a local area word memory means that stores a local area word indicating a local area in association with geography information for specifying the local area; an article data acquiring means that acquires article data; a characteristic word extracting means that extracts characteristic words from the article data; a characteristic word specifying means that specifies a characteristic word which is not stored in the local area word memory means as the local area word, from the extracted characteristic words; a search result means that acquires a result of searching performed in a search device, according to the specified characteristic word; and a local area specifying means that specifies a local area related to the article data based on the search result of the search result means, and finds geography information, and is characterized in that the local area specifying means stores the specified characteristic word in the local area word memory means as the local area word in association with the specified local area.

In the information processing device according to an aspect of the invention the characteristic word extracting means extracts a search result characteristic word from the search result of the search result means, and the local area specifying means refers to the local area word memory means, specifies the local area from the relevant word, and finds the geography information.

In the information processing according to an aspect of the invention the search result means searches for a plurality of related words around the specified characteristic word, and the local area specifying means specifies the local area from the search result characteristic word, and finds the geography information.

In the information processing device according to an aspect of the invention the local area specifying means calculates an appearance frequency of the characteristic word extracted from the article data, specifies the local area based on the calculated appearance frequency and finds the geography information.

In the information processing device according to an aspect of the invention the local area word memory means has a weighting value per local area word, and the local area specifying means specifies the local area based on the calculated appearance frequency and the weighting value, and finds the geography information.

The information processing device according to an aspect of the invention further includes: an article content specifying means that specifies article content of the article data; an article data memory means that stores the article data in association with the specified article content and the specified local area; a mapping means that maps a symbol corresponding to the article data on a map based on the specified local area; and a relevant article collecting means that refers to the article data memory means, and collects information about articles related to the specified local area and the specified article content, and is characterized in that the mapping means mans symbols in accordance with a number of the collected articles.

In the information processing device according to an aspect of the invention the mapping means determines an arrangement position of the article data in the symbol in accordance with an amount of information of the article data.

In the information processing device according to an aspect of the invention the article content specifying means specifies a category of the article content, and the mapping means changes a mode of the symbol per category.

In the information processing device according to an aspect of the invention the article data acquiring means acquires article data related to a search keyword, a distribution time information specifying means specifies information about a distribution time at which the article data is distributed, from the article data, and the mapping means maps visualization information for visually associating, on a map, symbols corresponding to a plurality of items of article data of different pieces of distribution time information in article data related to the search keyword.

According to an aspect of the invention, an information processing method of processing information in an information processing device includes: a local area word memory step of associating and storing a local area word indicating a local area, and geography information for specifying the local area, in a local area word memory means; an article data acquiring step of acquiring article data; a characteristic word extracting step of extracting characteristic words from the article data; a characteristic word specifying step of specifying a characteristic word which is not stored in the local area word memory means as the local area word, from the extracted characteristic words; a search result step of acquiring a result of searching performed in a search device, according to the specified characteristic word; and a local area specifying step of specifying a local area related to the article data based on the search result of the search result means, and finding geography information, and is characterized in that, in the local area specifying step, the specified characteristic word is stored in the local area word memory means as the local area word in association with the specified local area.

An aspect of the invention causes a computer to function as: a local area word memory means that stores a local area word indicating a local area in association with geography information for specifying the local area; an article data acquiring means that acquires article data; a characteristic word extracting means that extracts characteristic words from the article data; a characteristic word specifying means that specifies a characteristic word which is not stored in the local area word memory means as the local area word, from the extracted characteristic words; a search result means that acquires a result of searching performed in a search device, according to the specified characteristic word; and a local area specifying means that specifies a local area related to the article data based on the search result of the search result means, and finds geography information, and is characterized in that the local area specifying means stores the specified characteristic word in the local area word memory means as the local area word in association with the specified local area.

An aspect of the invention has an information processing program recorded thereon that causes a computer to function as: a local area word memory means that stores a local area word indicating a local area in association with geography information for specifying the local area; an article data acquiring means that acquires article data; a characteristic word extracting means that extracts characteristic words from the article data; a characteristic word specifying means that specifies a characteristic word which is not stored in the local area word memory means as the local area word, from the extracted characteristic words; a search result means that acquires a result of searching performed in a search device, according to the specified characteristic word; and a local area specifying means that specifies a local area related to the article data based on the search result of the search result means, and finds geography information, and is characterized in that the local area specifying means stores the specified characteristic word in the local area word memory means as the local area word in association with the specified local area.

Effect of the Invention

The invention extracts characteristic words from article data, specifies from the extracted characteristic words a characteristic word which is not stored as a local area word in a database which stores a local area word indicating a local area in association with geography information for specifying a local area, acquires a result of searching performed in a search device according to the specified characteristic word, specifies the local area associated with the article data based on the search result and finds geography information, so that it is possible to specify a local area even from a word which appears in an article and does not exist in the database.

BRIEF DESCRIPTION OF THE DRAWINGS

FIG. 3A is a schematic view illustrating an example of a data structure of a local area word database in FIG. 2.

FIG. 3B is a schematic view illustrating an example of a data structure of the local area word database in FIG. 2.

FIG. 3C is a schematic view illustrating an example of a data structure of the local area word database in FIG. 2.

FIG. 3B is a schematic view illustrating an example of a data structure of the local area word database in FIG. 2.

FIG. 3E is a schematic view illustrating an example of a data structure of the local area database in FIG. 2.

FIG. 5 is a schematic view illustrating an example of a data structure of a word association database in FIG. 4.

FIG. 11 is a schematic view illustrating an example of a table constructed in a database of the information processing server in FIG. 1.

FIG. 17 is a schematic view illustrating a modified example of article data acquired by the information processing server.

FIG. 18 is a schematic view illustrating a modified example of article data acquired by the information processing server.

FIG. 24 is a schematic view illustrating an example of a table constructed in the database of the information processing server in FIG. 1.

MODES FOR CARRYING OUT THE INVENTION

Hereinafter, embodiments of the invention will be described with reference to the drawings.

[1. Outline of Configuration and Function of Information Processing System]

First, an outline of an information processing system according to an embodiment of the invention will be described using FIG. 1.

Figure 1:
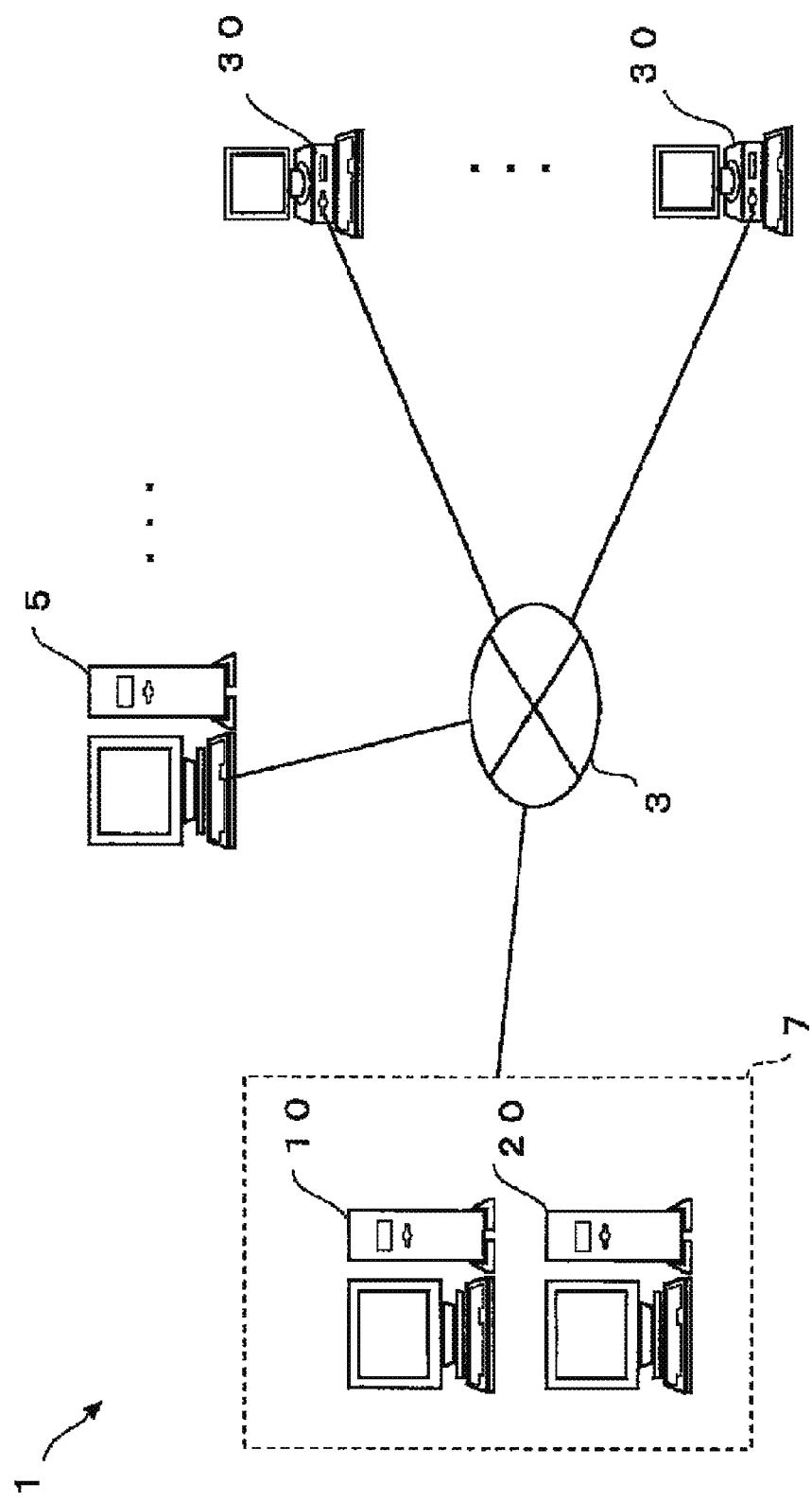
FIG. 1 is a schematic view illustrating a schematic configuration example of an information processing system according to an embodiment of the invention.

FIG. 1 is a schematic view illustrating a schematic configuration example of an information processing system 1 according to the present embodiment.

As illustrated in FIG. 1, the information processing system 1 has, for example, an information processing server (an example of an information processing device) 10 which acquires article data from, for example, a new distribution site 5, and specifies a local area related to the article data, a search server 20 (an example of a search device) which has a search database for specifying the local area related to the article data, and a terminal 30 in which user browses the article data organized by the information processing server 10.

The information processing server 10 and the search server 20 are connected through, for example, a local area network to transmit and receive data to and from each other, and configure a server system 7. Further, the server system 7 and a plurality of terminals 30 are connected through a network 3, and can transmit and receive data using a communication protocol (for example, TCP/IP). In addition, the network 3 is constructed by, for example, Internet, a dedicated communication line (for example, a CATV (Community Antenna Television) line), a mobile communication network (including, for example, base stations) and a gateway. In addition, the information processing server 10 may be connected to a shopping server (not illustrated) which manages shopping sites, through, for example, the local area network.

The information processing server 10 extracts a characteristic word such as a name of a place or a landmark included in article data acquired from, for example, the news distribution site 5, and specifies a local area related to the article data. Further, the information processing server 10 provides to the terminal 30 a webpage in which symbols corresponding to the article data are mapped on a map based on geography information related to the specified local area. Meanwhile, the geography information is information related to a local area such as a name of a local area, a local area relevant word such as a landmark, an address, a code such as a postal code and a longitude/latitude.

[2. Configuration and Function of Server]

(2.1 Configuration and Function of Information Processing Server 10)

Next, a configuration and a function of the information processing server 10 will be described using FIG. 2.

Figure 2:
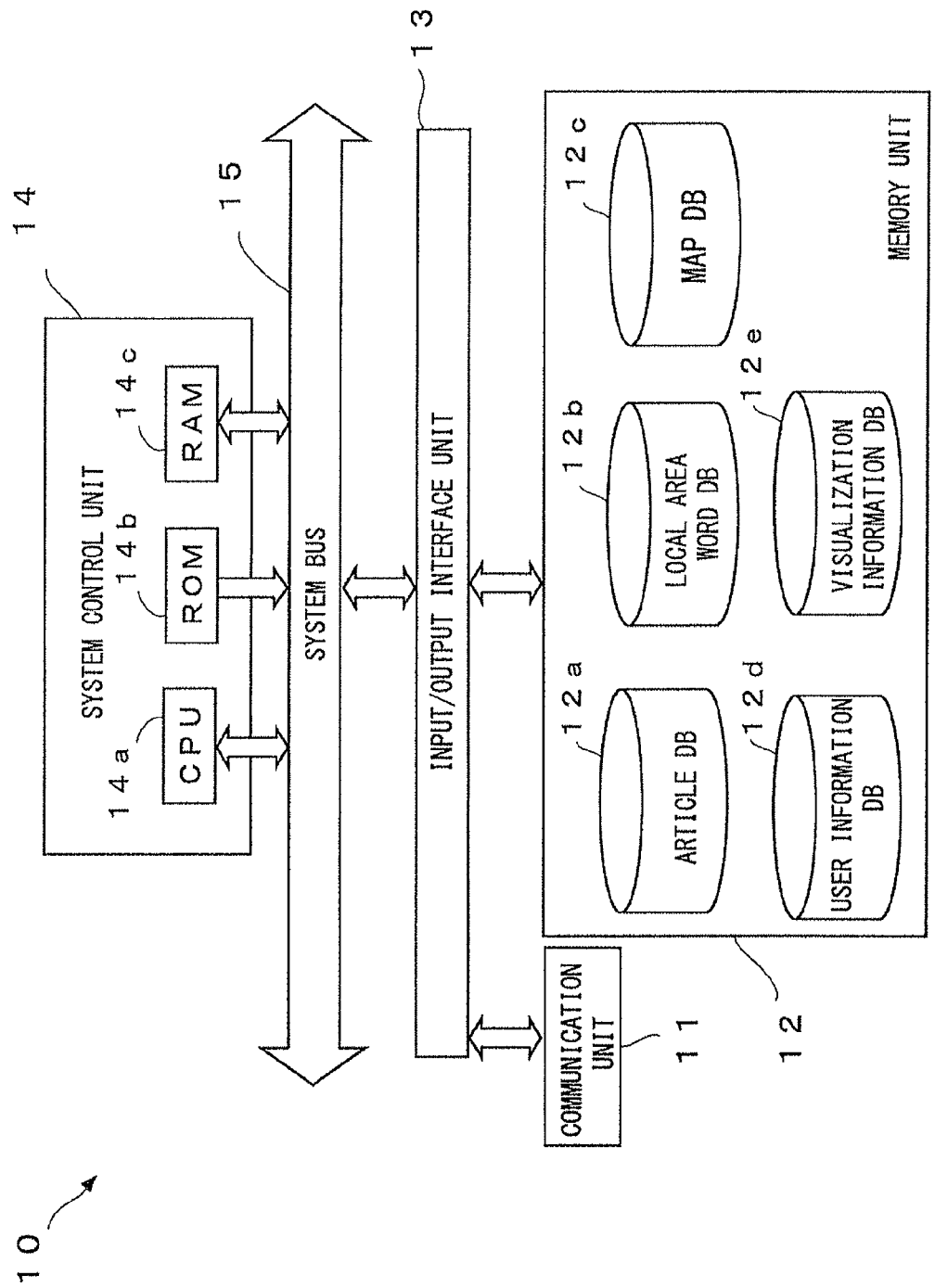
FIG. 2 is a block diagram illustrating an example of an outline of an information processing server in FIG. 1.

FIG. 2 is a block diagram illustrating an example of an outline of the information processing server 10.

As illustrated in FIG. 2, the information processing server 10 which functions as a computer has a communication unit 11, a memory unit 12, an input/output interface unit 13 and a system control unit 14. Further, the system control unit 14 and the input/output interface unit 13 are connected through a system bus 15.

The communication unit 11 connects to the network 3 to control a communication state with, for example, the news distribution site 5 and the terminal 30, and further connects to the local area network to transmit and receive data to and from, for example, the search server 20 on the local area network.

The memory unit 12 is configured to include, for example, a hard disk drive, and stores, for example, various programs such as an operating system, a server program and a program of causing, for example, the terminal 30 to download and execute the program, and data. In addition, for example, the various programs may be acquired from, for example, another server device through the network 3, or be recorded in a recording medium and read through a drive device. Further, in the memory unit 12, for example, webpage files described by a markup language such as HTML (HyperText Markup Language) or XML (Extensible Markup Language) are stored.

Further, the memory unit 12 includes, for example, an article database (referred to as "article DB" below) 12a which stores, for example, article data acquired from, for example, the news distribution site 5, a local area word database (referred to as "local area word DB" below) 12b which stores local area words and local area relevant words such as names of places and landmarks per local area, a map database (referred to as "map DB" below) 12c which stores information related to a map, a user information database (referred to as "user information DB" below) 12d which stores user information and a visualization information database (referred to as "visualization information DB" below) 12e which stores visualization information for visually associating items of article data on a map.

In the article DB 12a which is an example of an article data memory means, for example, article content, a category, distribution time information and geography information related to article data are associated with an article ID and stored together with the acquired article data. Further, in the article DB 12a, keywords for specifying article content or categories of articles are also stored. Furthermore, in the article DB 12*a*, an article count table obtained by counting the number of articles per geography information and per article content related to a specified area or per specified area and per category is stored. Still further, in the article DB 12*a*, index information and snippets generated by an indexer from article data acquired from, for example, the news distribution site 5 to search for news articles are stored. Moreover, in the article DB 12*a*, a table for grouping searched article data based on position information and distribution time information is stored.

In the local area word DB 12*b* which is an example of a local area word memory means, as illustrated in FIGS. 3A to 3E, local area words such as names of prefectural and city governments, names of local governments, postal codes and names of addresses, local area relevant words such as names of landmarks are stored in association with geography information such as information about longitudes/latitudes indicated by local areas. In addition, local area words and local area relevant words may be stored in association with geography codes which are allocated per name of a place corresponding to a point on a map (for example, a local public organization code allocated to each local public organization).

As illustrated in FIGS. 3A to 3E, the local area word DB 12*b* includes a landmark table, a prefectural and city government table, a local government table, a postal code table and an address table of specified street addresses. Further, when a local area is specified from article data, a weight is assigned upon statistical processing of a characteristic word extracted from article data. For example, in case of the landmark table as illustrated in FIG. 3A, a five-fold weight is assigned to a landmark name. Incase of the prefectural and city government table as illustrated in FIG. 3B, one-fold weight is assigned to a name of a prefectural and city governments. In case of the local government table as illustrated in FIG. 3C, a two-fold weight is assigned to a name of a local government. In case of the postal code table as illustrated in FIG. 3D, a three-fold weight is assigned to a postal code. In case of the address table of specified street addresses as illustrated in FIG. 3E, a four-fold weight is assigned to a specified address. The weights to be assigned to each of these tables are stored in the local area word DB 12*b*. In addition, as illustrated in FIG. 3A, landmarks are also associated with addresses in the landmark table.

In the map DB 12*c*, for example, image data of maps of various scales, longitude/latitude data, postal code data and address data are stored.

In the user information DB 12*d*, user IDs, names, addresses, places of birth, telephones numbers, electronic mail addresses of users registered as members, and attribute information such as sexes and ages of the users are registered. Further, in the user information DB 12*d*, each user's purchase history of products purchased at, for example, a shopping site is stored using a user ID as a key. In addition, a purchase history may be acquired from a shopping server through, for example, the local area network.

In the visualization information DB 12*e*, for example, basic forms of arrows (an example of visualization information) are stored. In addition, modified types obtained by controlling, for example, thicknesses, lengths, directions, shapes, colors and shapes of start points and end points of these arrows based on, for example, the number of articles, distribution time information about collected article data, and population data in a predetermined area on a map are stored.

The input/output interface unit 13 is an interface between the communication unit 11 and the memory unit 12, and the system control unit 14.

The system control unit 14 includes, for example, a CPU (Central Processing Unit) 14*a*, a ROM (Read Only Memory) 14*b* and a RAM (Random Access Memory) 14*c*. When the CPU 14*a* reads and executes various programs stored in the ROM 14*b* and the memory unit 12, the system control unit 14 performs processing with respect to acquired article data.

Further, the system control unit 14 collects article data from the news distribution site 5, and transmits processed article data to the terminals 30 through the communication unit 11.

(2.2 Configuration and Function of Search Server 20)

Next, a configuration and a function of the search server 20 will be described based on the drawing.

Figure 4:
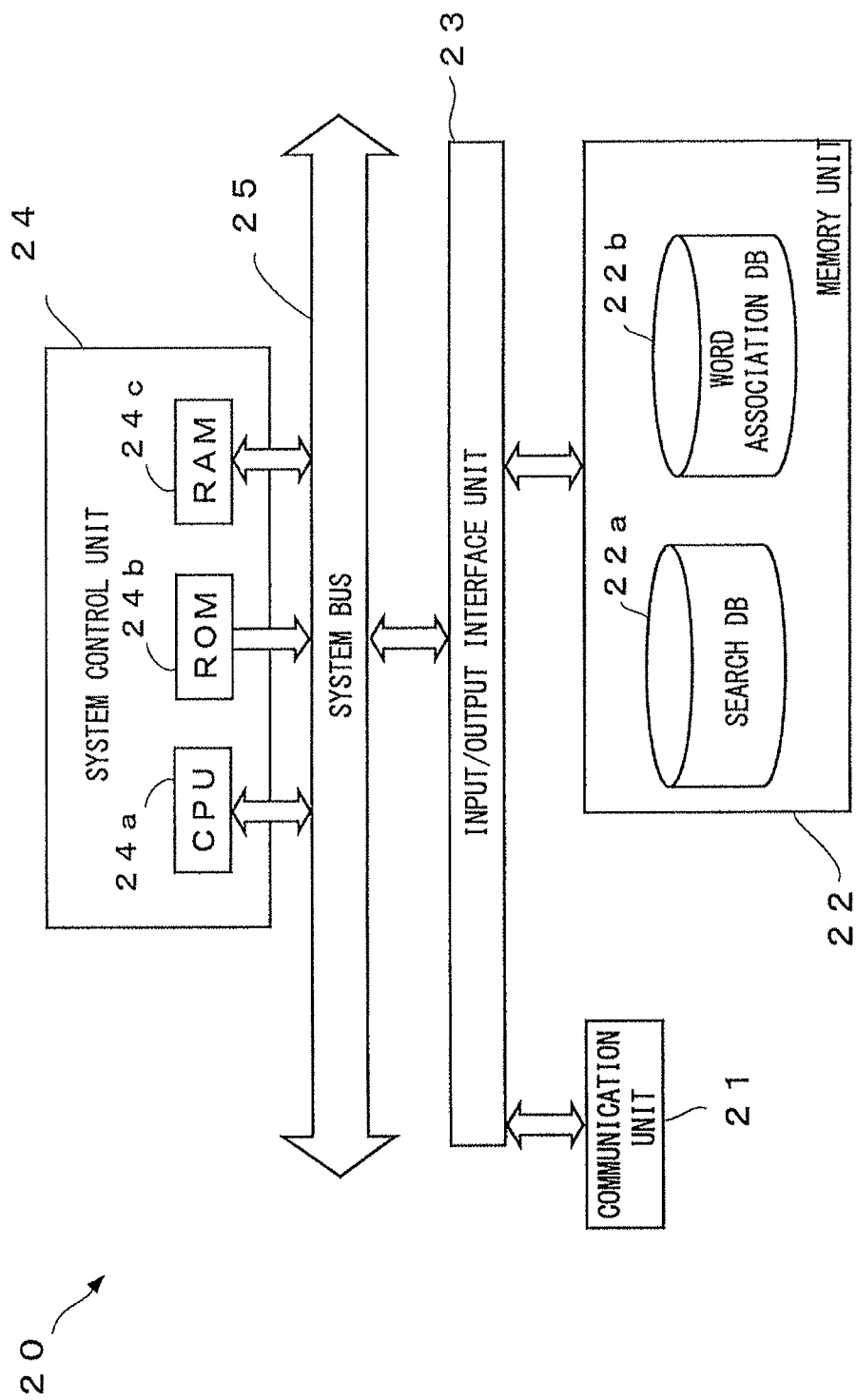
FIG. 4 is a block diagram illustrating an example of an outline of a search server in FIG. 1.

FIG. 4 is a block diagram illustrating an example of a schematic configuration of the search server 20.

As illustrated in FIG. 4, the search server 20 has a communication unit 21, a memory unit 22, an input/output interface unit 23 and a system control unit 24, and the system control unit 24 and the input/output interface unit 23 are connected through a system bus 25. In addition, the configuration and the function of the search server 20 are substantially the same as the configuration and the function of the information processing server 10, and differences from each configuration and each function of the information processing server 10 will be mainly described.

For example, the communication unit 21 controls a communication state with, for example, the information processing server 10 through, for example, the network 3 or the local area network.

In the memory unit 22, for example, a search database (referred to as "search DB" below) 22*a*, and a word association database (referred to as "word association DB" below) 22*b* are constructed.

In the search DB 22*a*, information about websites related to search keywords is stored. For example, information about URLs (Uniform Resource Locators) of websites, index information for searching and snippets of search results are stored in the search DB 22*a*.

As illustrated in FIG. 5, the word association DB 22*b* functions as an example of a word association memory database which generates an association between words in accordance with the relevance between words to store words related to a word in accordance with, for example, the degree of relevance between words. When there are a plurality of relevant words, relevant words are stored as a first relevant word and a second relevant word.

The system control unit 24 includes, for example, a CPU 24*a*, a ROM 24*b* and a RAM 24*c*. Further, when the CPU 24*a* reads and executes various programs stored in the ROM 24*b* and the memory unit 22, the system control unit 24 performs processing such as searching in response to a request from the information processing server.

(2.3 Configuration and Function of Terminal 30)

Next, a configuration and a function of the terminal 30 will be described using FIG. 6.

Figure 6:
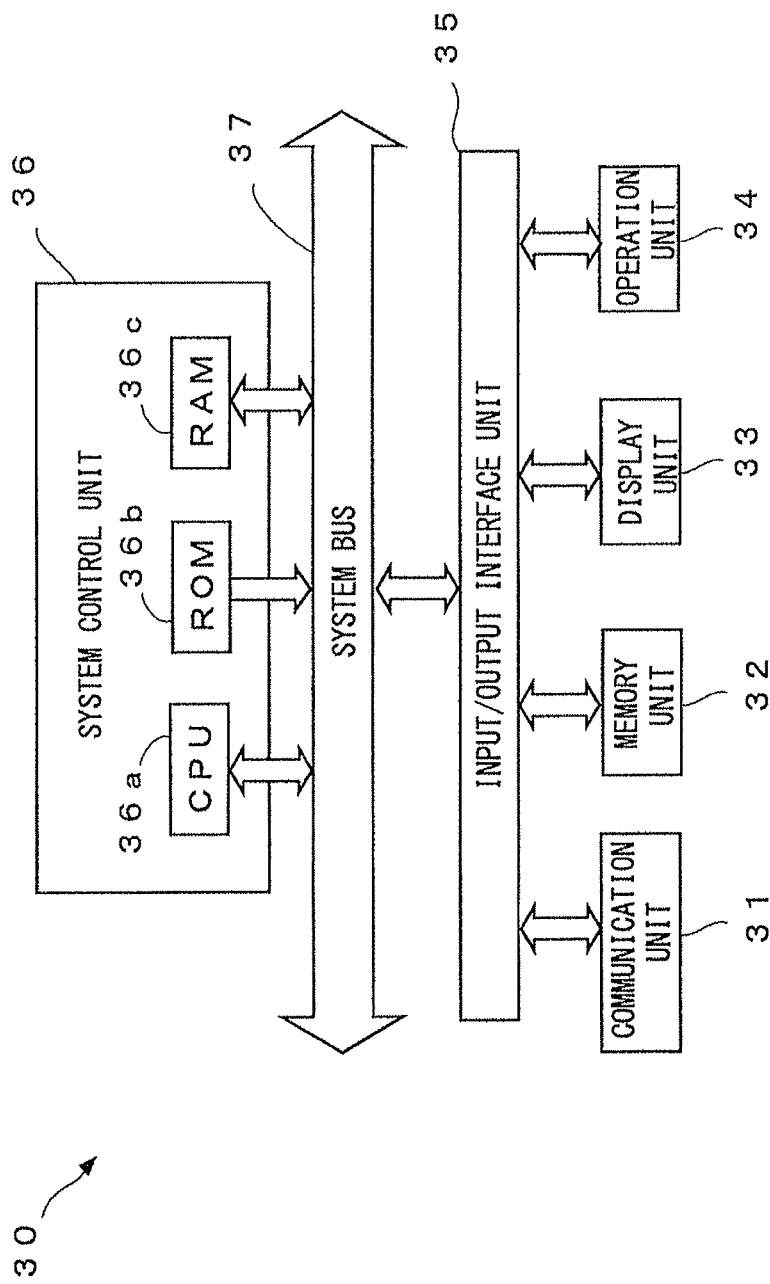
FIG. 6 is a block diagram illustrating an example of a schematic configuration of a terminal in FIG. 1.

FIG. 6 is a block diagram illustrating an example of a schematic configuration of the terminal 30.

As illustrated in FIG. 6, the terminal 30 which functions as a computer is a personal computer or a mobile terminal such as a mobile wireless telephone or a PDA, and has a communication unit 31, a memory unit 32, a display unit 33, an operation unit 34, an input/output interface unit 35 and a system control unit 36. Further, the system control unit 36 and the input/output interface unit 35 are connected through a system bus 37.

The communication unit 31 controls communication with, for example, the information processing server 10 through the network 3. In addition, when the terminal 30 is a mobile wireless telephone, the communication unit 31 has a wireless communication function of connecting to the mobile communication network of the network 3.

The memory unit 32 includes, for example, a hard disk drive, and stores, for example, an operating system and a web browser program.

The display unit 33 is formed with, for example, liquid crystal display elements or EL (Electro Luminescence) elements. The display unit 33 displays, for example, a pointer which is moved by operating a mouse or webpages including article data acquired from the information processing server 10.

The operation unit 34 includes, for example, a keyboard and a mouse. For example, the operation unit 34 selects a symbol corresponding to article data arranged on a map.

The input/output interface unit 35 is an interface between the communication unit 31 and the memory unit 32, and the system control unit 36.

The system control unit 36 has, for example, a CPU 36a, a ROM 36b and a RAM 36c. Further, when the CPU 36a reads and executes various programs stored in the ROM 36b, the RAM 36c and the memory unit 32, the system control unit 36 displays webpages acquired from the information processing server 10, on the display unit 33 by executing a script of a webpage.

[3. Operation of Information Processing System According to First Embodiment]

Next, an operation of the information processing system 1 according to the first embodiment will be described using FIGS. 7 to 14.

(3.1 To Specify Local Area)

First, information processing of specifying a local area such as a new landmark which does not exist in the local area word DB 12b and registering the local area in the local area word DB 12b will be described using FIG. 7.

Figure 7:
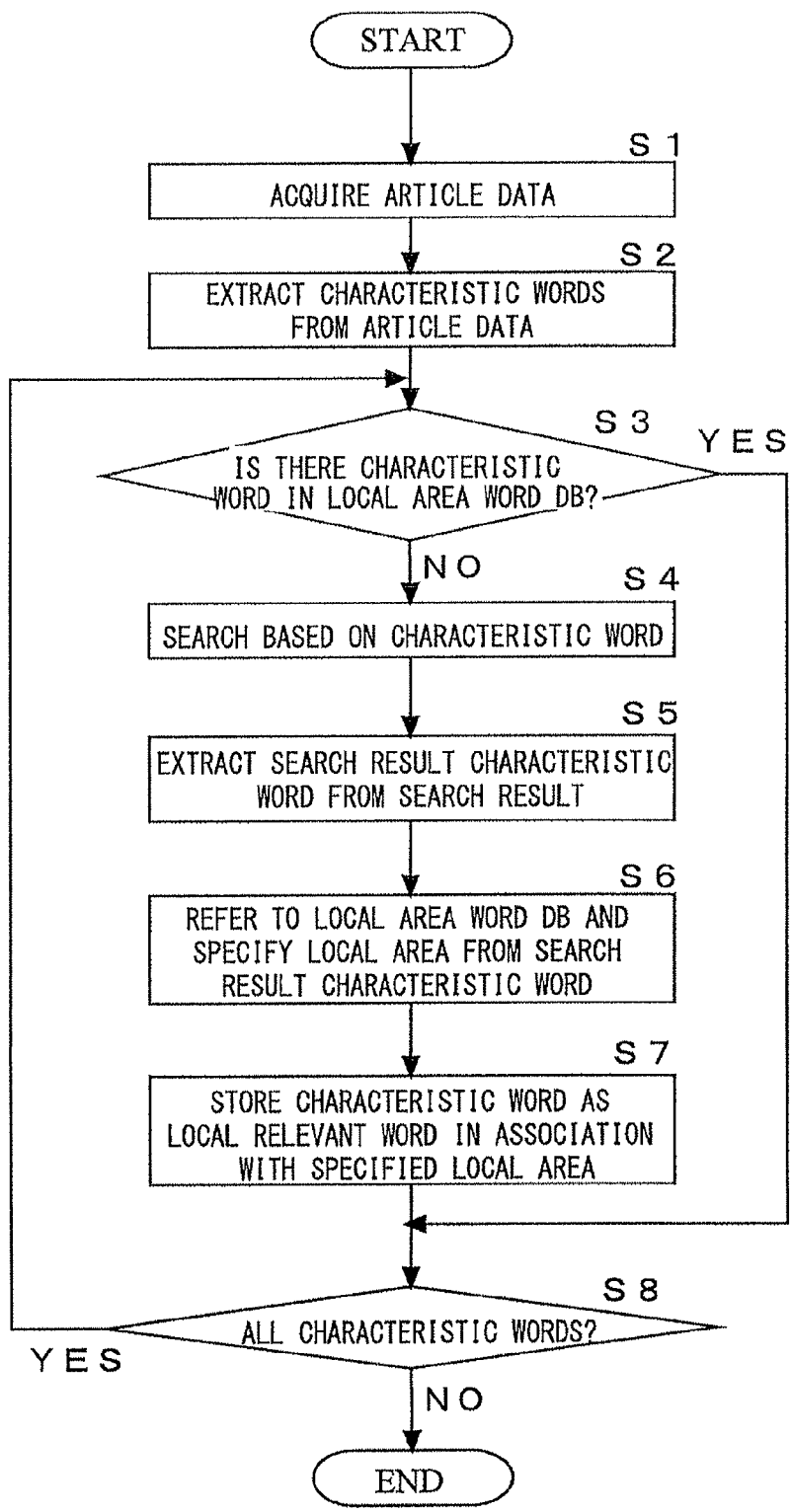
FIG. 7 is a flowchart illustrating an operation example of the information processing server in FIG. 1 for specifying a local area in a first embodiment.

FIG. 7 is a flowchart illustrating an operation example of the information processing server for specifying a local area in the information processing server 10.

As illustrated in FIG. 7, the information processing server 10 acquires article data (step S1). More specifically, the system control unit 14 of the information processing server 10 serves as an example of an article data acquiring means to acquire, for example, a sentence of article data listed in a news distribution site from the news distribution site 5 through the communication unit 11. For example, the system control unit 14 of the information processing server 10 accesses the news distribution site and acquires article data based on URL (Uniform Resource Locator) information of the news distribution site. In addition, the system control unit 14 of the information processing server 10 assigns an article ID to article data to store in article DB 12a in order to specify an article.

Next, the information processing server 10 extracts characteristic words from article data (step S2). More specifically, the system control unit 14 of the information processing server 10 performs, for example, morpheme analysis or syntax analysis of a sentence of article data, and extracts a characteristic word such as a noun as a candidate of a local area word or a local area relevant word. In this case, the system control unit 14 of the information processing server 10 counts the number of extracted characteristic words.

Thus, the system control unit 14 of the information processing server 10 functions as an example of a characteristic word extracting means that extracts a characteristic word from article data.

Next, the information processing server 10 decides whether or not the extracted characteristic word exists in the local area word DB 12b (step S3). More specifically, the system control unit 14 of the information processing server 10 refers to the landmark table, the prefectural and city government table, the local government table, the postal code table and the address table of specified street names in the local area word DB 12b, and decides whether or not the extracted characteristic word corresponds to, for example, a characteristic word registered in the local area word DB 12b. The system control unit 14 of the information processing server 10 specifies a characteristic word which is not stored in the characteristic word DB 12b as a local area word or a local area relevant word. For example, a landmark which is "◦◦ tree" is being built, and "◦◦ tree" does not exist in the local area word 12b. Thus, the system control unit 14 of the information processing server 10 functions as an example of a characteristic word specifying means that specifies a characteristic word which is not stored in the local area word memory means as a local area word, from the extracted characteristic words.

When the extracted characteristic words do not exist in the local area word DB 12b (step S3; NO), the information processing server 10 performs searching based on a characteristic word (step S4). More specifically, the system control unit 14 of the information processing server 10 makes a request for web search for the specified characteristic word to the search server 20.

Next, the information processing server 10 extracts a search result characteristic word from a search result (step S5). More specifically, the system control unit 14 of the information processing server 10 acquires a search result such as a snippet from the search server 20. Further, the system control unit 14 of the information processing server 10 performs, for example, morpheme analysis as in step S2 based on the search result, and extracts the search result characteristic word. Thus, the system control unit 14 of the information processing server 10 functions as an example of a search result means that acquires a result of searching performed in a search device according to the specified characteristic word.

Next, the information processing server 10 refers to the local area word DB 12b, and specifies a local area from the search result characteristic word (step S6). More specifically, the system control unit 14 of the information processing server 10 refers to the local area word DB 12b, and extracts the search result characteristic word which is a local area word or a local area relevant word. Further, the system control unit 14 of the information processing server 10 specifies a local area in accordance with an appearance frequency from the extracted search result characteristic words, and specifies the local area taking into account a weight assigned to each table such as the landmark table of the local area word DB 12b. Furthermore, the system control unit 14 of the information processing server refers to the local area word DB 12b, and finds the longitude/latitude (an example of geography information) of the specified local area. Thus, the system control unit 14 of the information processing server 10 functions as an example of a local area specifying means that specifies a local area related to article data and finds geography information based on the search result in the search result means. Further, the system control unit 14 of the information processing server 10 functions as an example of a local area specifying means that refers to a characteristic word extracting means that extracts a search result characteristic word from the search result of the search result means and the local area word memory means, specifies a local area from the search result characteristic word and finds geography information. Further, the system control unit 14 of the information processing server 10 functions as an example of a local area specifying means that specifies a local area based on the calculated appearance frequency and a weighting value, and finds geography information. In addition, details of how to specify a local area will be described later.

Next, the information processing server 10 stores a characteristic word as a local area relevant word in association with the specified local area (step S7). More specifically, the system control unit 14 of the information processing server 10 stores it in the landmark table of the local area word DB 12b in association with geography information such as the longitude/latitude and an address of the specified local area. For example, a new landmark (an example of a local area relevant word) which is "∘∘ tree" is registered in the local area word DB 12b in association with the longitude/latitude or an address. Thus, the system control unit 14 of the information processing server 10 functions as an example of the local area specifying means that stores the specified characteristic word in the local area memory means as a local area word in association with the specified local area.

After step S7 or when the extracted characteristic word exists in the local area word DB 12b (step S3; YES), the information processing server 10 decides whether or not all extracted characteristic words are processed (step S8). More specifically, the system control unit 14 of the information processing server 10 subtracts one from the number of extracted characteristic words (the number of times of counting) one by one, and, when the number of characteristic words becomes zero (step S8; NO), finishes processing. When the number of times of counting is not zero (step S8; YES), the step returns to step S3 to process the next characteristic word.

(3.2 To Acquire Article Data for Mapping)

Next, processing which is necessary to collect article data, and specify and schematize a local area indicated by article data will be described using FIGS. 8 to 11.

Figure 8:
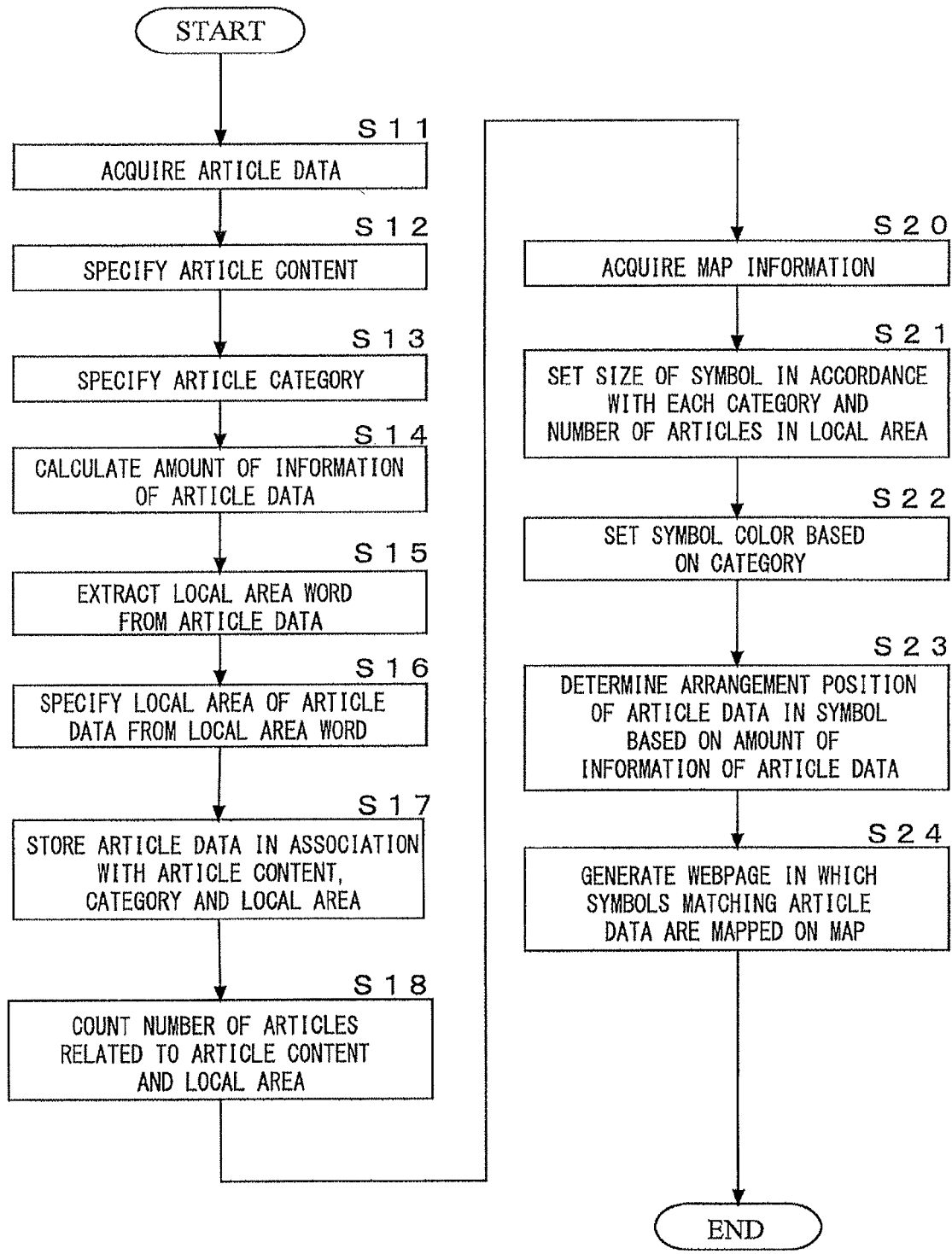
FIG. 8 is a flowchart illustrating an operation example of the information processing server in FIG. 1 for mapping article data.
Figures 9, 10:
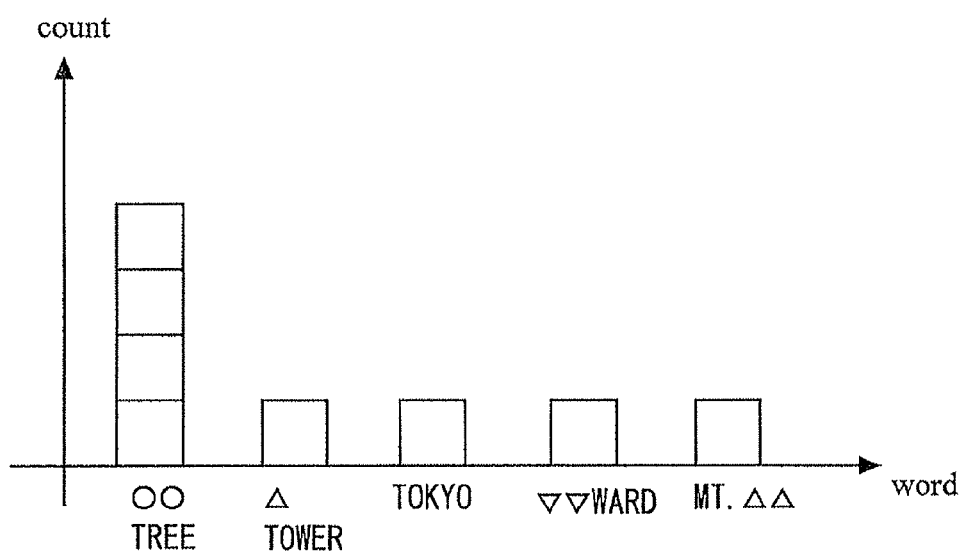
FIG. 9 is a schematic view illustrating an example of article data acquired by the information processing server.
FIG. 10 is a schematic view illustrating an example of a frequency of an extracted local area word.

FIG. 8 is a flowchart illustrating an operation example of the information processing server 10 for mapping article data. FIG. 9 is a schematic view illustrating an example of article data acquired by the information processing server 10. FIG. 10 is a schematic view illustrating an example of a frequency of an extracted local area word. FIG. 11 is a schematic view illustrating an example of a table constructed in a database of the information processing server 10.

First, an operation of acquiring article data from, for example, the news distribution site 5, and storing, for example, article data in the article data DB 12a in step S11 to step S18 will be described.

The information processing server 10 acquires article data (step S11). More specifically, the system control unit 14 of the information processing server 10 acquires article data illustrated in FIG. 9 according to the same processing as in step S1.

Next, the information processing server 10 specifies article content (step S12). More specifically, the system control unit 14 of the information processing server 10 functions as an example of an article content specifying means to perform morpheme analysis, extract characteristic words from a sentence of article data, match the characteristic words and a keyword for specifying article content stored in the article DB 12b, and specify article content. For example, the system control unit 14 of the information processing server 10 specifies that, when there are characteristic words such as "home-run" and "hitter" related to baseball in article data, article content is specified as "baseball". In addition, the system control unit 14 of the information processing server 10 may specify article content according to, for example, an algorithm of summarizing an existing sentence.

Next, the information processing server 10 specifies an article category (step S13). More specifically, the system control unit 14 of the information processing server 10 functions as an example of an article content specifying means to refer to the article DB 12a, and specify a category to which the specified article content belongs. When, for example, article content is "baseball", a category is "sport". In addition, a news article is generally classified into a category such as "world" or "sport" in a news distribution site, and the system control unit 14 of the information processing server 10 may specify an article category depending on from which category article data is acquired in the news distribution site. For example, there is information about a category in URL information depending on a news distribution site, and the system control unit 14 of the information processing server 10 specifies an article category based on URL information including article data.

Next, the information processing server 10 calculates the amount of information of article data (step S14). More specifically, the system control unit 14 of the information processing server 10 calculates the amount of information of article data from the amount of data of article data corresponding to the volume of an article, and the number of letters in a sentence and the number of words. Further, the system control unit 14 of the information processing server 10 may calculate the number of nouns in a sentence of article data, the number of adjectives and the number of adverbs by, for example, morpheme analysis or syntax analysis, and calculate the amount of information of article data based on the number of these parts of speech.

Next, the information processing server 10 extracts local area words from article data (step S15). More specifically, the system control unit 14 of the information processing server 10 extracts characteristic words similar to step S2, refers to the local area word DB 12b, and extracts a name of a place or a landmark as an example of geography information from the acquired article data. For example, the system control unit 14 of the information processing server 10 extracts local area words and local area relevant words such "∘∘ tree", "Tokyo", "Δ tower", "hotels in Tokyo", "∇∇ ward" and "∘Δ company" in article data. In addition, in case of a characteristic word which does not exist in the local area word DB 12b, the system control unit 14 of the information processing server 10 may extract words as local area relevant words through step S4 to step S7.

Next, the information processing server 10 specifies a local area related to article data, from a local area and a local area relevant word (step S16). More specifically, the system control unit 14 of the information processing server 10 calculates an appearance frequency of geography information extracted from the article data. As illustrated in FIG. 10, a histogram of the extracted local area words and local area relevant words are found. Further, the system control unit 14 of the information processing server 10 specifies a local area based on the calculated appearance frequency. For example, the system control unit 14 of the information processing server 10 finds "∘∘ tree" which is counted the most in the article. Next, the system control unit 14 refers to, for example, the landmark table in the local area word DB 12b, and calculates the longitude/latitude of "○○ tree" which is necessary to map the article on the map. Geography information which repeatedly appears in article data is highly probably geography information for specifying the article data.

In addition, the system control unit 14 of the information processing server 10 may find geography information such as a geography code corresponding to a local area. For example, the system control unit 14 of the information processing server 10 refers to the local area word DB 12b, and determines as a geography code a local public organization code of a local public organization which includes a local area relevant word "ΔΔ dome". Further, in case of "○Δ company", the system control unit 14 of the information processing server 10 specifies a location of a head office as geography information.

Next, the information processing server 10 stores article data by associating the specified article data, the specified category and the specified local area (step S17). For example, the system control unit 14 of the information processing server 10 functions as an example of an article data memory means to store the specified article content "baseball", the specified category "sport", the longitude/latitude of the specified local area word "ΔΔ ward, Tokyo" and the geography code in the article DB 12a in association with the acquired article data.

Next, the information processing server 10 counts the number of articles related to article content and geography information (step S18). More specifically, as illustrated in FIG. 11, the system control unit 14 of the information processing server 10 functions as an example of a relevant article collecting means to increase a counter for a geography code of the acquired article data and article content by one in a table 12t constructed in the article DB 12a. In this case, as illustrated in FIG. 11, the system control unit 14 of the information processing server 10 associates the counter with the category. Thus, the system control unit 14 of the information processing server 10 collects information about an article related to the specified geography information and article content by increasing the number of times of counting in the table 12t.

In addition, the system control unit 14 of the information processing server 10 may collect information about an article of, for example, similar content of the acquired article as an example of an article related to the specified local area and article content. A similar article includes, for example, an article of the same category, an article of a similar category or an article of a geographically close position. The system control unit 14 of the information processing server 10 may count the number of similar articles.

(3.3 To Display Article Data)

Next, an operation of generating a webpage (window screen) to be displayed on the display unit 33 of the terminal 30 in step S20 to step S24 will be described using FIGS. 12 to 16.

Figure 12:
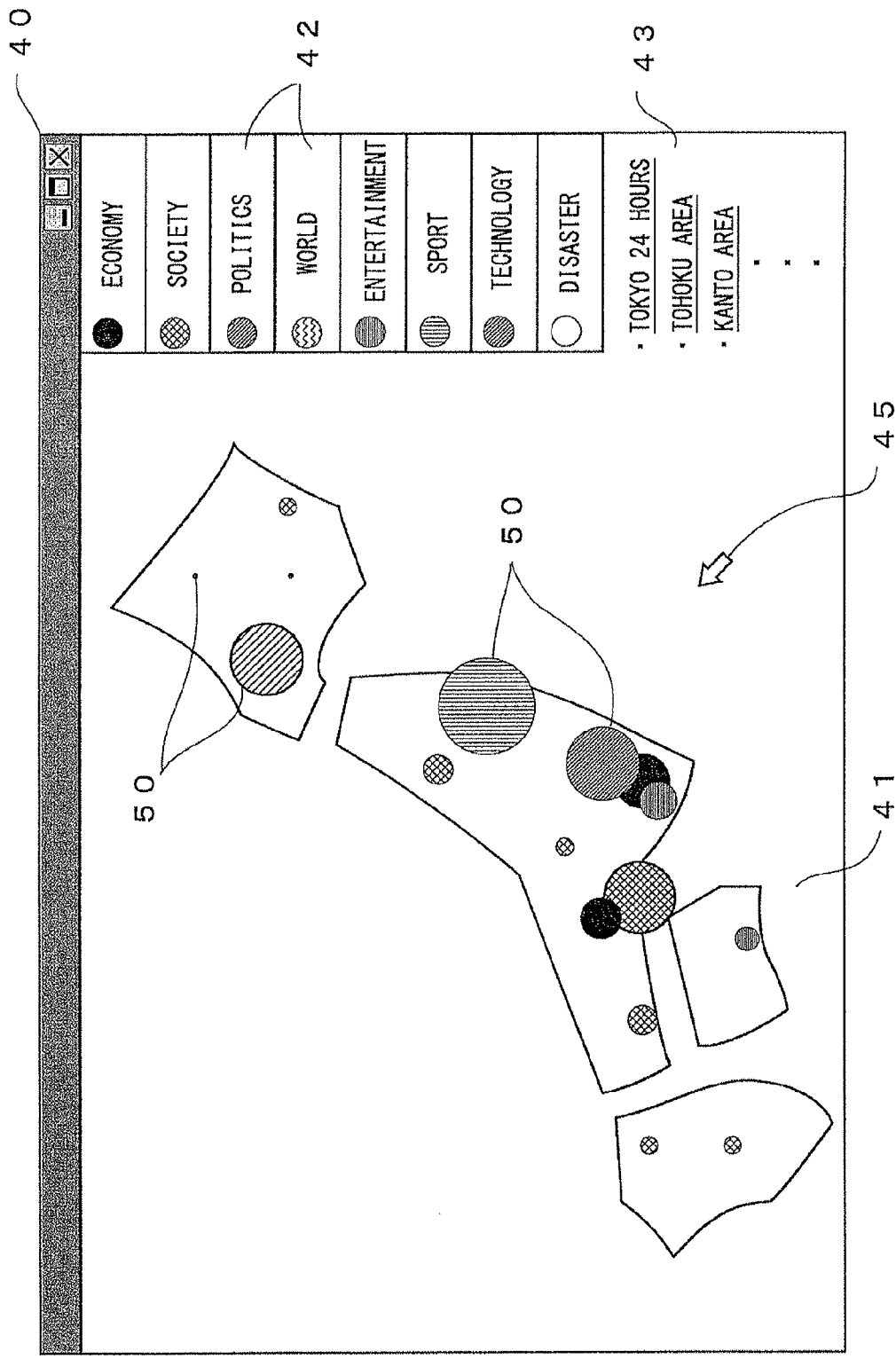
FIG. 12 is a schematic view illustrating an example of a window screen displayed on the terminal in FIG. 1.
Figure 13:
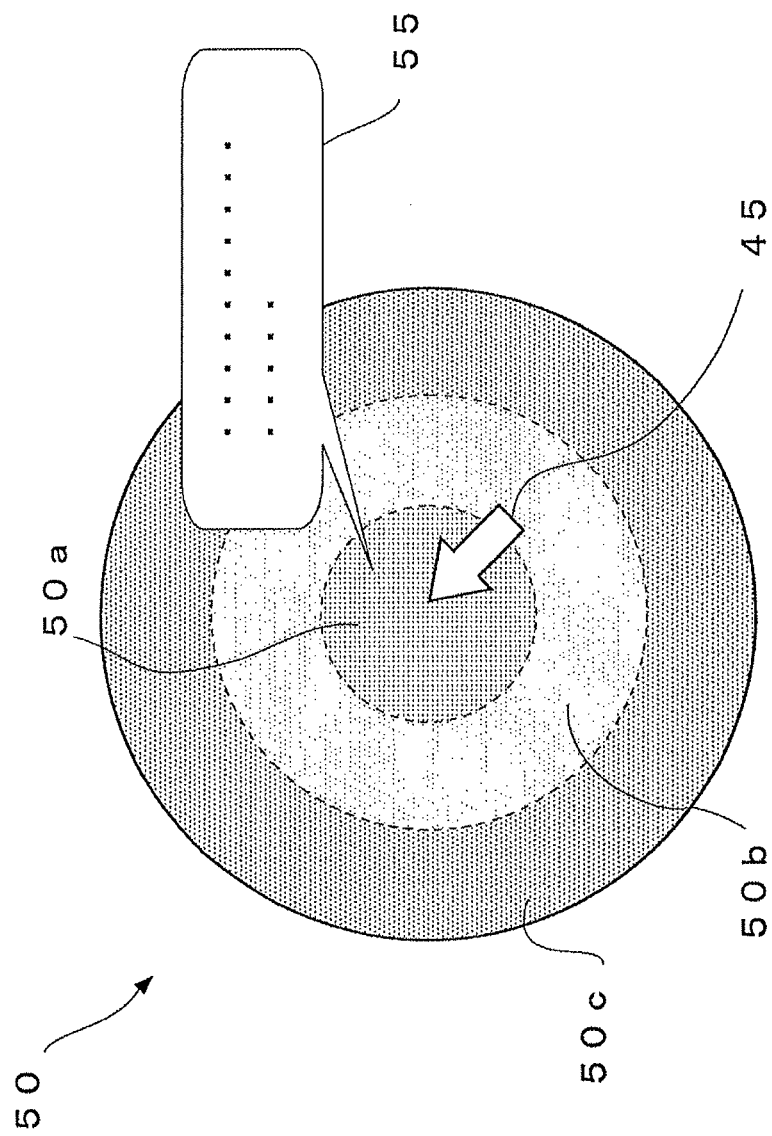
FIG. 13 is a schematic view illustrating an example of a symbol corresponding to article data displayed on the terminal in FIG. 1.
Figure 14:
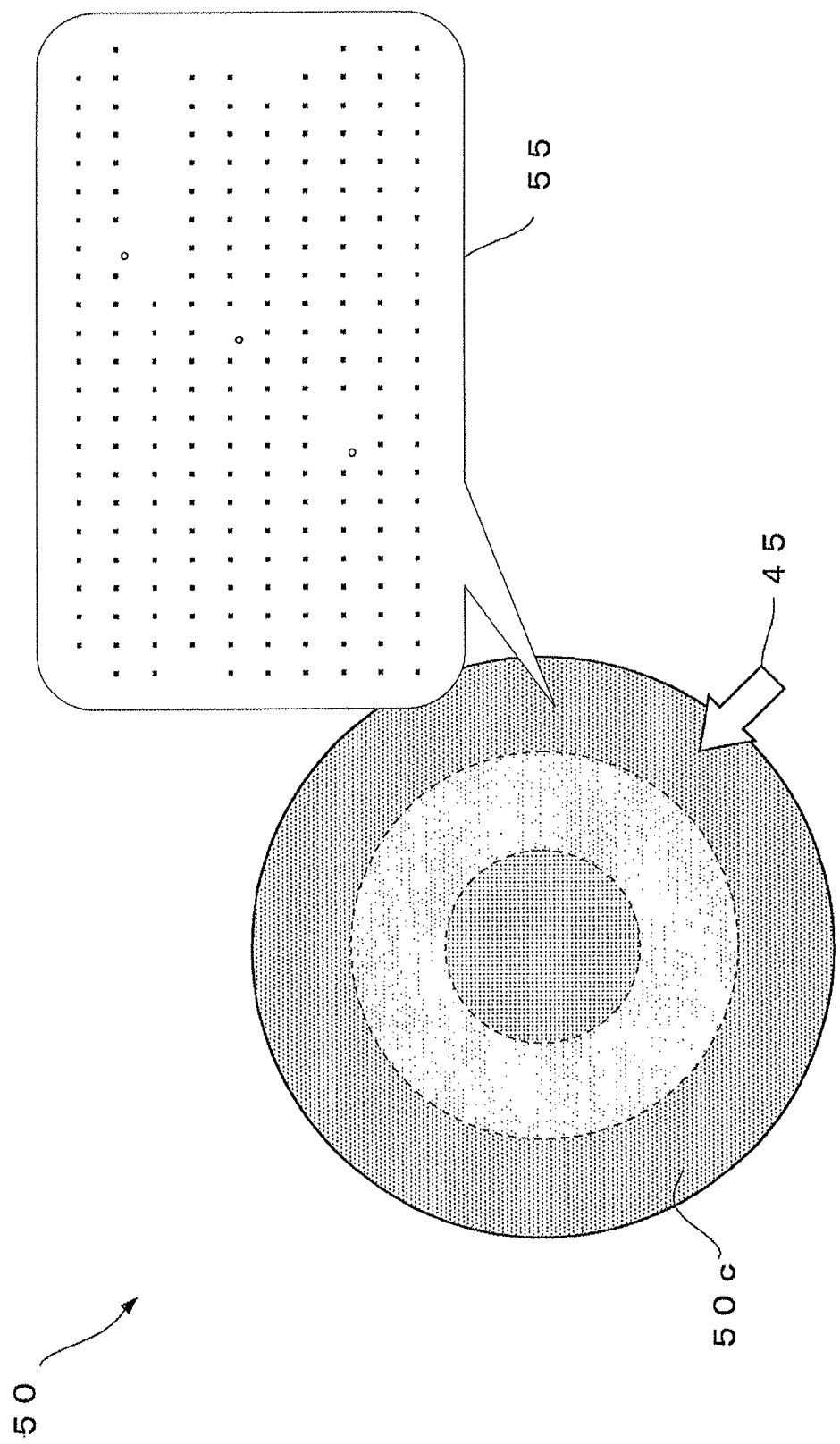
FIG. 14 is a schematic view illustrating an example of a symbol corresponding to article data displayed on the terminal in FIG. 1.
Figure 15:
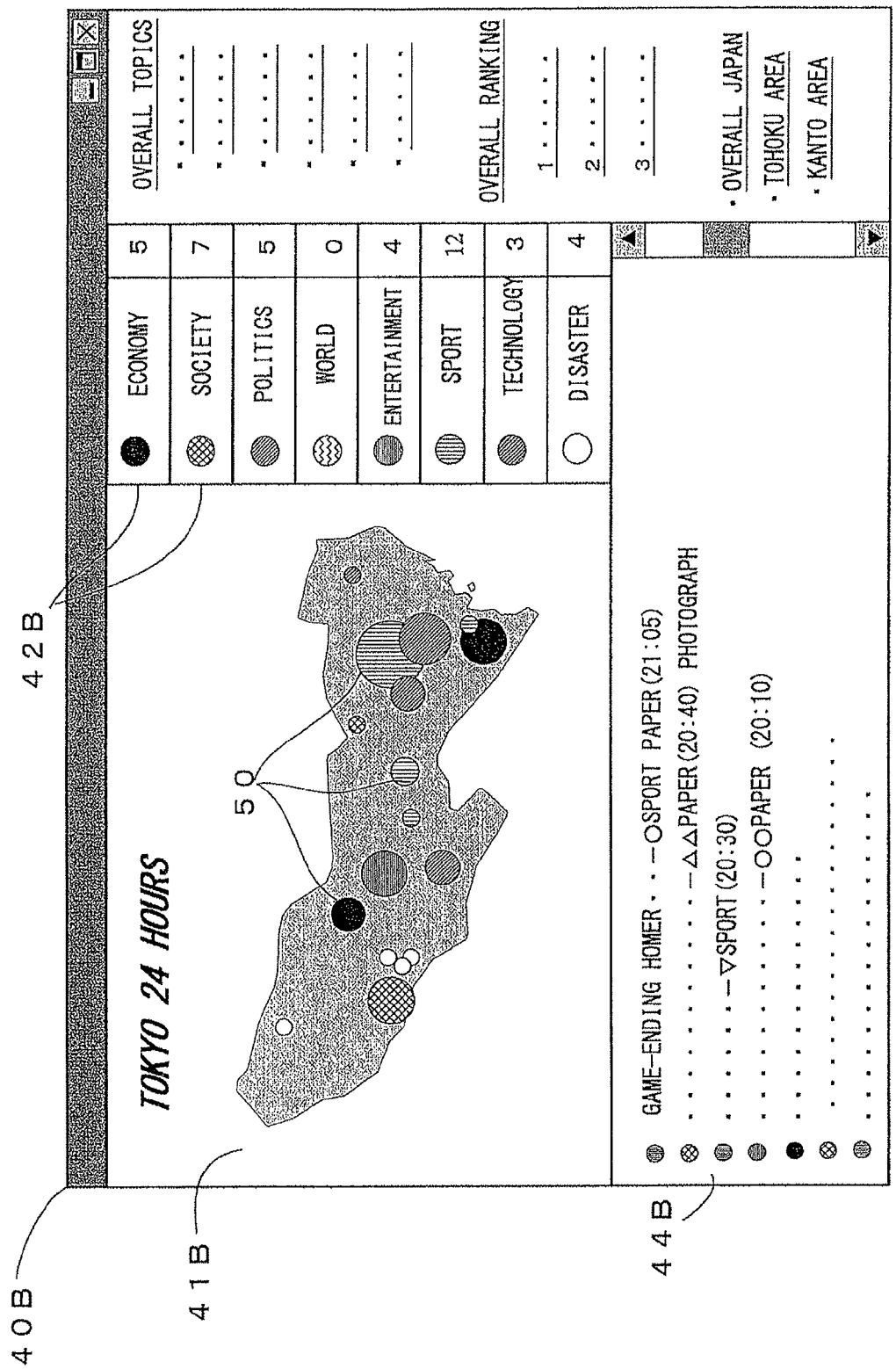
FIG. 15 is a schematic view illustrating an example of a window screen displayed on the terminal in FIG. 1.
Figure 16:
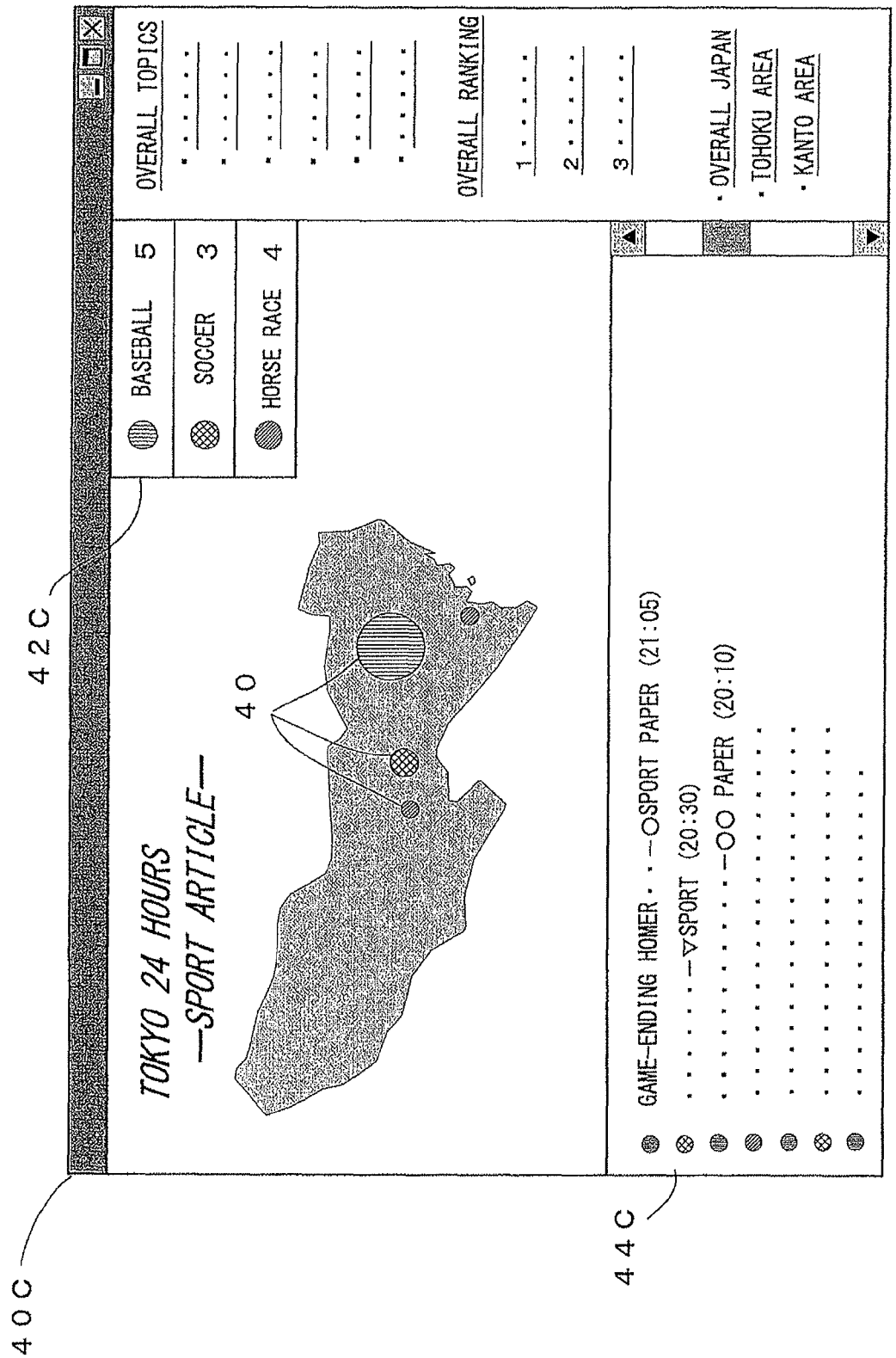
FIG. 16 is a schematic view illustrating an example of a window screen displayed on the terminal in FIG. 1.

FIG. 12 is a schematic view illustrating an example of a window screen displayed on the terminal 30. FIG. 13 is a schematic view illustrating an example of a symbol corresponding to article data displayed on the terminal 30. FIG. 14 is a schematic view illustrating an example of a symbol corresponding to article data displayed on the terminal 30. FIGS. 15 and 16 are schematic views illustrating examples of a window screen displayed on the terminal 30.

As illustrated in FIG. 8, the information processing server 10 acquires map information (step S20). For example, as illustrated in FIG. 12, the system control unit 14 of the information processing server 10 acquires map information 41 of Japan from the map DB 12c.

Next, the information processing server 10 sets the size of a symbol in accordance with each category and the number of articles in a local area (step S21). The system control unit 14 of the information processing server 10 functions as an example of a mapping means to refer to the table 12t constructed in the article DB 12a, count the number of times of counting a geography code belonging to each prefecture in prefectural and city government units and article content belonging to each category, calculate the number of articles and set the size of each symbol 50 to be mapped as illustrated in FIG. 12. Thus, the system control unit 14 of the information processing server 10 controls the size of a symbol in accordance with a result in step S18 (relevant article collecting means) to display.

Next, the information processing server 10 sets a color of the symbol in the category (step S22). As indicated by hatchling lines corresponding to colors in FIG. 12, the system control unit 14 of the information processing server 10 sets a color combination according to the category of each symbol 50. Further, the system control unit 14 of the information processing server 10 sets a color combination of a legend of the symbols in a category column 42 as illustrated in FIG. 12.

Next, the information processing server 10 determines an arrangement position of article data in a symbol based on the amount of information of article data (step S23). As illustrated in FIG. 13, for example, the system control unit 14 of the information processing server 10 divides the symbol 50 into concentric areas 50a, 50b and 50c in accordance with the number of articles, and associates the area 50a in the center portion with article data of a little amount of information. As indicated by a balloon 55 in FIG. 14, article data of a greater amount of information is sequentially associated with the areas 50b and 50c on an outer side.

Further, as illustrated in FIGS. 13 and 14, the system control unit 14 of the information processing server 10 sets, for example, a webpage such that document of article data is displayed in the balloon 55 when a pointer 45 operated by the operation unit 34 of the terminal 30 overlaps each of the areas 50a, 50b and 50c. Furthermore, the system control unit 14 of the information processing server 10 sets, for example, a webpage such that a link destination related to detailed article data or article data is displayed when each of the areas 50a, 50b and 50c is clicked by the operation unit 34.

Next, the information processing server 10 generates a webpage in which symbols corresponding to article data are mapped on the map (step S24). More specifically, the system control unit 14 of the information processing server 10 functions as an example of a mapping means to generate a webpage 40 in which the symbols 50 corresponding to article data are mapped on the geography information 41 of Japan as illustrated in FIG. 12.

Further, as illustrated in FIG. 15, the system control unit 14 of the information processing server 10 also generates a webpage 40B related to another area 41b in map information of Japan. In this case, the system control unit 14 of the information processing server 10 refers to the article DB 12a including the table 12t based on a geography code included in an area to be displayed, and collects information related to, for example, article data and the number of articles of each category.

Further, when a specific category of the category column 42B in the webpage 40B is clicked, the system control unit 14 of the information processing server 10 refers to the article DB 12*a* including the table 12*t* and generates a webpage 40C such that the symbols 50 per article content such as "baseball" or "soccer" are displayed as illustrated in FIG. 16. Meanwhile, in the webpage 40C an article content column 42C is displayed. In addition, the system control unit 14 of the information processing server 10 may generate a webpage such that summary columns 44B and 44C of an article are displayed as illustrated in FIGS. 15 and 16.

Further, the system control unit 14 of the information processing server 10 transmits information related to the webpage 40 to the terminal 30 through the communication unit 11 in response to the request from the terminal 30.

Next, the system control unit 36 of the terminal 30 which has received the information related to the webpage 40 through the communication unit 31 displays, for example, the webpages 40, 40B and 40C on the display unit 33.

As described, according to the present embodiment, by extracting characteristic words from article data, specifying from the extracted characteristic words a characteristic word which is not stored as a local area word in the local area word DB 12*b* which stores a local area word indicating a local area in association with geography information for specifying a local area, acquiring a result of searching performed in a search device according to the specified characteristic word, specifying the local area associated with the article data based on the search result, finding geography information, and storing the specified characteristic word in the local area word DB 12*b* as a local area word in association with the geography information and the specified local area, it is possible to specify a local area even from a word which appears in an article and does not exist in the local area word DB 12*b*.

Further, when a search result characteristic word is extracted from a search result, and a local area is specified from the search result characteristic word referring to the local area word DB 12*b*, it is possible to improve precision for specifying a local area by collecting and utilizing a wide variety of characteristic words which enable a name of a local area to be specified from information such as a website.

Furthermore, when geography information related to article content and article data of the acquired article data is specified, the symbols 50 corresponding to article data and having the size in accordance with information about an article related to the specified geography information and article content are mapped and displayed on a map based on the specified geography information, it is possible to visualize article data such that users' convenience is improved. Still further, the symbols 50 having the size in accordance with information about an article related to the specified geography information and article content enable users to easily recognize where a related article frequently appears on a map.

Moreover, as illustrated in FIGS. 13 and 14, when an arrangement position of article data in the symbol 50 is determined in accordance with the amount of information of article data, the system control unit 14 of the information processing server 10 can intelligibly provide article data to users in accordance with, for example, the volume of an article. Particularly when an article of a small volume is arranged in the area 50*a* in the center portion of the symbol 50, a short article is usually based only on an objective fact, and, when the area 50*a* of the symbol 50 is clicked, the system control unit 14 of the information processing server 10 can provide an article on objective facts about a date, people, a place and officially known facts to the users.

Further, when a category of article content is specified and a mode of the symbol 50 is set per category, the mode of the symbol 50 makes the category intelligible and the system control unit 14 of the information processing server 10 can provide display of article data which the users can easily select.

Furthermore, when geography information is specified based on the appearance frequency of geography information in article data, the system control unit 14 of the information processing server 10 can precisely specify geography information without being influenced by geography information which is noise.

Still further, when the number of articles related to the specified geography information and article content is counted in the table 12*t* and the size of the symbol is controlled and displayed in accordance with the number of articles, it is possible to easily count the number of articles. Moreover, the users can easily recognize what article related to which part of the map appears frequently.

Figure 19:
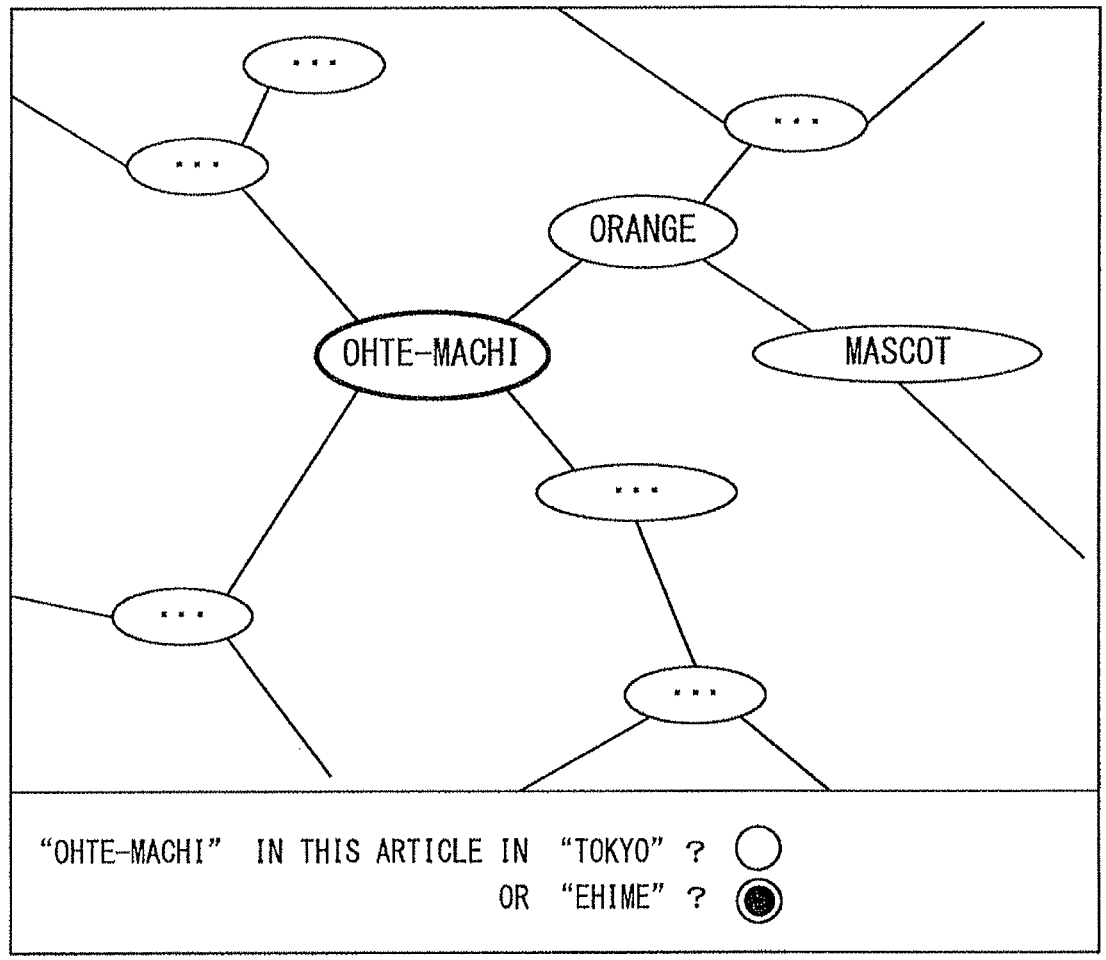
FIG. 19 is a schematic view illustrating an example of an association between characteristic words extracted from an article.

Next, a modified example of specifying a local area in step S6 and step S16 will be described using FIGS. 17 to 19.

The system control unit 14 of the information processing server 10 assigns a weight to the frequencies of a local area word and a local area relevant word in accordance with the weight of each table stored in the local area word DB 12*b* such that the local area can be specified even when the frequencies of the local area word and the local area relevant word extracted from article data are the same. "Δ tower" is a landmark, and therefore a weight is five-fold and a score is "5". Meanwhile, "Δ○ prefecture" and "Δ▽ prefecture" are names of prefectural and city governments, and therefore a weight is one-fold and a score is "1". Further, "Δ tower" is counted the most from a distributed article, and the longitude and the latitude corresponding to "Δ tower" are specified referring to the landmark table using the distributed article as a position information to be mapped.

According to the next modified example, the system control unit 14 of the information processing server 10 may apply tf-idf (Term Frequency-Inverse Document Frequency) to a characteristic word, a local area word and a local area relevant word. In case of, for example, an article illustrated in FIG. 17, when a paragraph A is a main portion of an article, about one hundred articles including information only about the paragraph A are distributed and about twenty articles including information about the paragraph A and a paragraph B are distributed. The system control unit 14 of the information processing server 10 calculates a score for each local area word and local area relevant word by applying tf-idf. Even when, for example, the appearance frequency of "Δ tower" is "4" and the appearance frequency of "○▽ city" is "1", a score of "○▽ city" is higher than a score of "Δ tower" and "○▽ city" is specified as a local area of the article. Further, the system control unit 14 of the information processing server 10 maps article data on the longitude and the latitude of "○▽ city". In this case, it is possible to map an article distributed earlier on a name of a place the appearance frequency of which is rare. Meanwhile, about twenty articles including information only about the paragraph A are distributed, about one hundred articles including information about the paragraph + the paragraph B are distributed. In this case, by applying tf-idf, the score of "Δ tower" is higher than the score of "○▽ city" in some cases.

Thus, when the system control unit 14 of the information processing server 10 calculates the appearance frequency of a characteristic word extracted in the article data, and specifies a local area based on the calculated appearance frequency, it is possible to improve precision to specify a local area.

According to another modified example, as illustrated in FIG. 18, when a proper name (a name of a person) such as "Mr./Ms. ●●●●" is included in an article, the system control unit 14 of the information processing server 10 specifies a broad area of "Shinagawa ward" instead of a level of a detailed area such as "xxx, Shinagawa ward". Further, the system control unit 14 of the information processing server 10 replaces "▼▼▼ store" in an article with "Shinagawa ward, Tokyo", "xxx, Shinagawa ward" with "xxx, Shinagawa" and the longitude and the latitude on which the article is mapped, with the longitude and the latitude corresponding to "Shinagawa ward, Tokyo". In this case, it is possible to prevent an article including a proper name from being mapped more accurately in more details.

Meanwhile, processing of specifying a local area in case that the same name of a place exists at different places.

A local area is specified from another local area name or local area relevant word in the same article. For example, an area name of "Ohte-machi" exists in Tokyo and Ehime, and, when "Ohte-machi" is extracted, the system control unit 14 of the information processing server 10 refers to geography information such as another local area word or local area relevant word in article data, and, in case of a name of a place or a landmark related to Tokyo, specifies the area name as "Ohte-machi in Tokyo". The system control unit 14 of the information processing server 10 specifies a local area indicating article data as indicated in step S16 when the local area is specified.

Further, the system control unit 14 of the information processing server 10 finds the relevance between characteristic words in article data, and associates characteristic words around "Ohte-machi" as an example of specified characteristic words. In addition, the system control unit 14 of the information processing server 10 performs morpheme analysis, and associates characteristic words and other words around "Ohte-machi" using, for example, a distance between the numbers of characters between characteristic words in an article and the word association DB 22b of the search server 20. The system control unit 14 of the information processing server 10 searches for a local area name and a local area relevant word among associated words around "Ohte-machi", and specifies a local area indicating the article.

When a plurality of related words around the characteristic words specified in this way are searched for and a local area is specified based on the related words, it is possible to improve precision to specify a local area by finding a local area from the related words. In addition, as illustrated in FIG. 19, it may be possible to make the display unit 33 of the terminal 30 display a graph indicating words of relevant destinations around "Ohte-machi", make users decide whether or not the specified local area is correct and receive an input. A local area indicated by an article is specified reflecting user's decision.

Next, a modified example of an operation will be described using FIGS. 20 and 21. In addition, this modified example is a modified example of an operation related to display of article data in step S20 and subsequent steps, and step S11 to step S18 will not be described.

Figure 20:
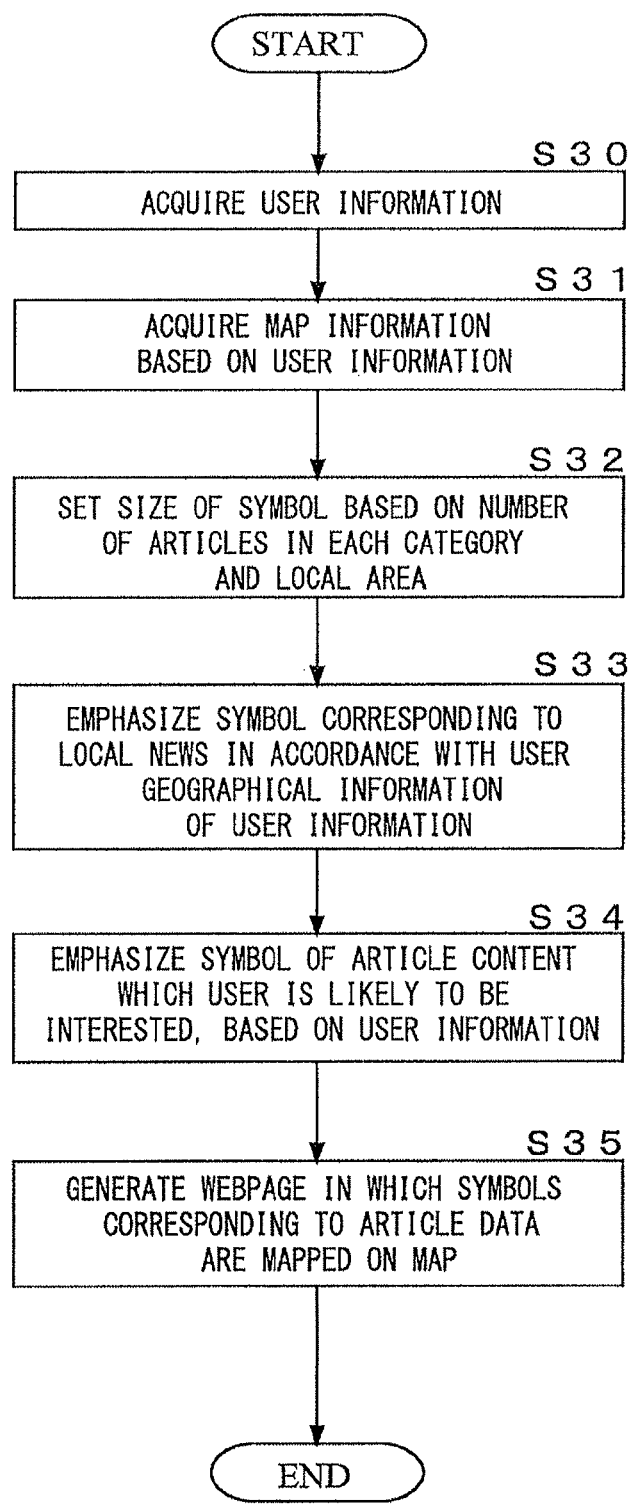
FIG. 20 is a flowchart illustrating a modified example of an operation of the information processing server in FIG. 1.
Figure 21:
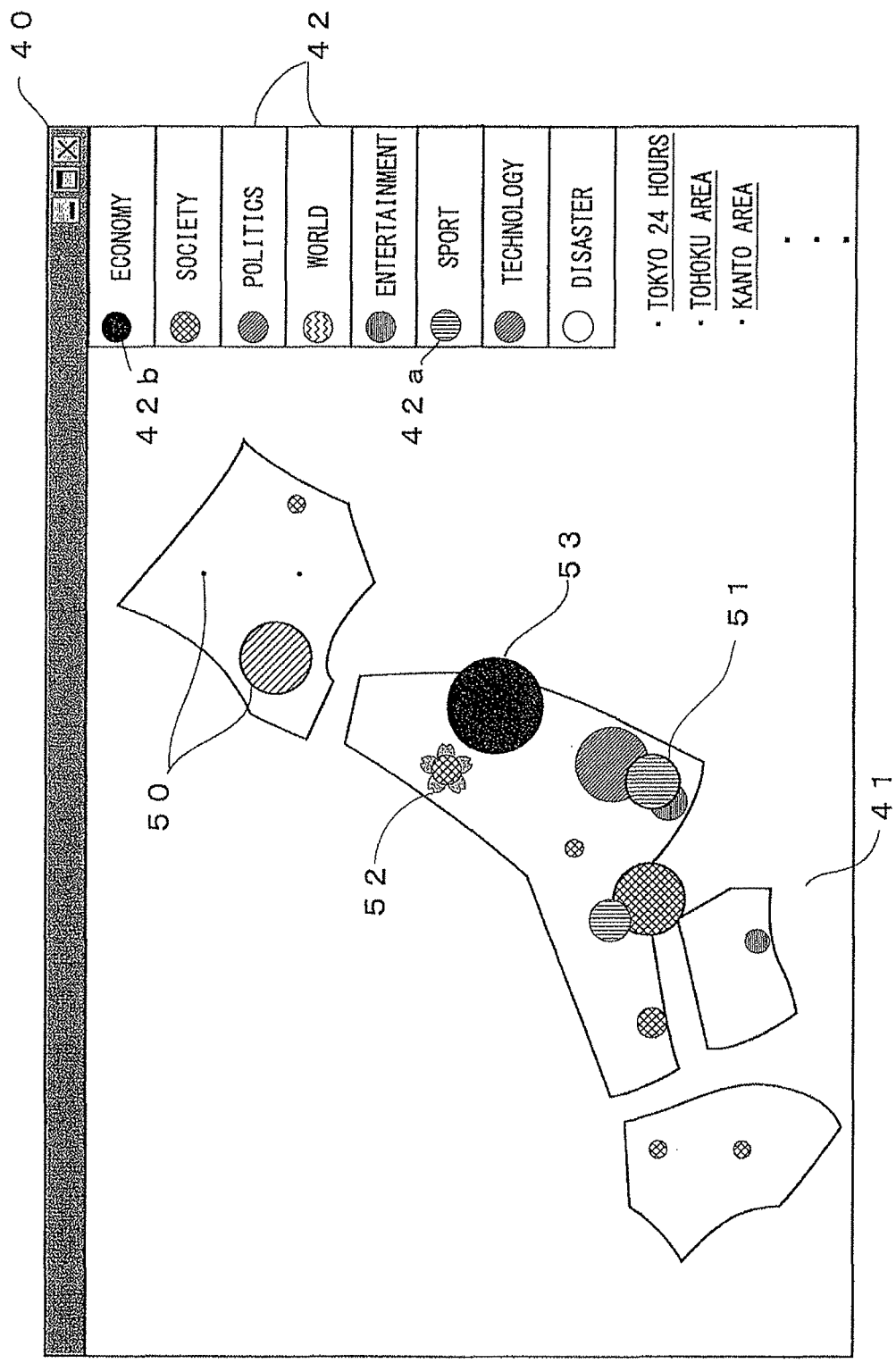
FIG. 21 is a schematic view illustrating a modified example of a window screen displayed on the terminal in FIG. 1.

FIG. 20 is a flowchart illustrating a modified example of an operation of the information processing server 10. FIG. 21 is a schematic view illustrating a modified example of a window screen displayed on the terminal 30.

As illustrated in FIG. 20, the information processing server 10 acquires user information (step S30). More specifically, the system control unit 14 of the information processing server 10 acquires, for example, a name, an address and a place of birth of a user, and the sex, the age and a purchase history of the user based on a user ID of the user who logs in, for example, a shopping site, from, for example, the user information DB 12d.

Next, the information processing server 10 acquires map information based on user information (step S31). More specifically, the system control unit 14 of the information processing server 10 acquires map information from the map DB 12c based on user geography information such as the address or the place of birth of user information.

Next, as in step S22, the information processing server 10 sets the size of a symbol according to each category and the number of articles in a local area (step S32).

Next, the information processing server 10 emphasizes the symbol corresponding to a local news in accordance with user geography information of user information (step S33). More specifically, the system control unit 14 of the information processing server 10 emphasizes the symbol corresponding to a local news according to an address or a place of birth of the user of user information. When, for example, symbols 51 mapped on an area such as a user address overlap other symbols, the system control unit 14 of the information processing server 10 emphasizes symbols by displaying the symbols 51 above the other symbols as illustrated in FIG. 21. Further, the system control unit 14 of the information processing server 10 emphasizes the symbol by changing a shape of a symbol 52 mapped on an area such as a place of birth of a user.

Next, the information processing server 10 emphasizes a symbol of article content which users are likely to be interested in, based on user information (step S34). More specifically, the system control unit 14 of the information processing server 10 specifies article content or a category which users are likely to be interested in, from user information such as ages or purchase histories of users from, for example, the user information DB 12d. Further, when, for example, a user is interested in sport, the system control unit 14 of the information processing server 10 changes a symbol indicating sport to, for example, a color or a pattern of the symbol which is the most eye-catching. As illustrated in FIG. 21, the system control unit 14 of the information processing server 10 exchanges a color combination of a legend of a symbol 42a and a symbol 42b in the category column 42, and exchanges a color combination of the symbol 51 and a symbol 53 on a map. In addition, a symbol only needs to be emphasized by, for example, flashing the symbol to emphasize and display these symbols.

Next, as in step S24, the information processing server 10 generates a webpage in which symbols corresponding to article data are mapped on a map (step S35).

As described above, when display of the symbols 50, 51 and 52 mapped on an area related to a user address of user information is set, the system control unit 14 of the information processing server 10 can provide display of article data intelligibly customized per user.

Further, when user information is acquired and display of the symbols 50 and 53 is set in accordance with the user information, the system control unit 14 of the information processing server 10 can intelligibly provide display of article data customized per user. Furthermore, it is possible to comprehend an article related to, for example, a place of residence of one user. Still further, when past articles are accumulated, associated in a symbol and displayed, it is possible to comprehend the articles tracing the articles back in the past.

Figure 22:
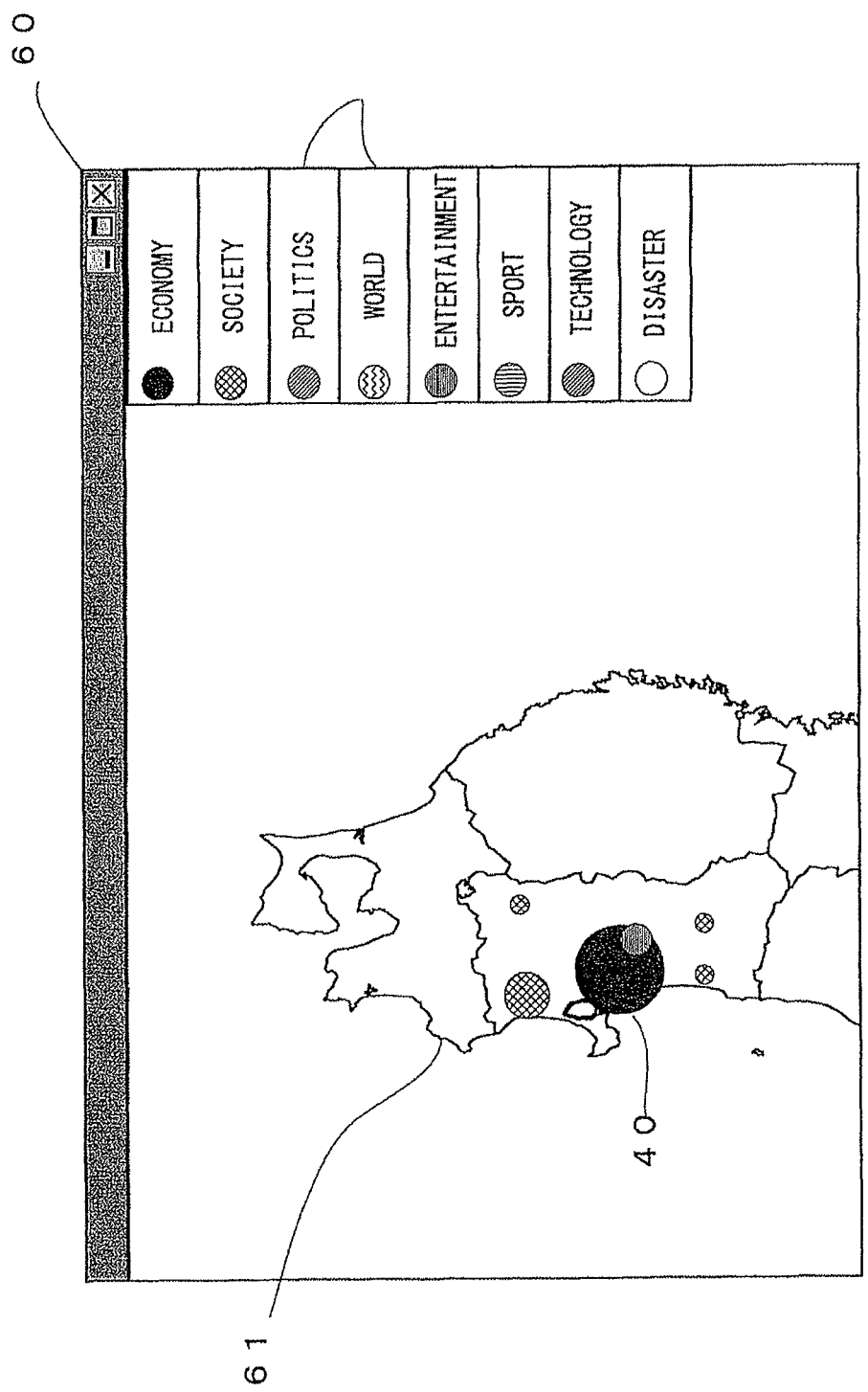
FIG. 22 is a schematic view illustrating a modified example of a window screen displayed on the terminal in FIG. 1.

In addition, the information processing server 10 may function as an example of a mapping means to seta display scale of a map in which an article is mapped in accordance with user information. As illustrated in FIG. 22, a webpage 60 is generated by expanding, for example, a display scale of an area map of a place of birth in accordance with user geography information such as a user address or a place of birth of user information similar to map information 61. In this case, the system control unit 14 of the information processing server 10 can provide display of article data intelligibly customized per user.

Further, when a distribution source of an article is a newspaper company in a district C, and there are peripheral local area names and local area relevant words including a district X in the article, the article may be associated with the district X.

In addition, in step S41, the system control unit 14 of the information processing server 10 may acquire as article data a result of searching for article data based on a search keyword, perform processings in step S42 to step S46 and perform processings in step S49 and subsequent steps. Further, article data may be other than a news article distributed by a distribution company or information of an event of a specific field which a general user lists in, for example, a blog or Twitter.

Furthermore, instead of collectively showing symbols per category, one article may be mapped on a map as a symbol.

Still further, a scale size of the map may be changed depending on a local area the map of which is displayed. In case of a map such as Tokyo including a great number of articles, a local area the scale size of which is increased and expanded is displayed, and, by contrast with this, a local area including a small number articles may be displayed as a broad area by decreasing the scale size.

As to the size of a symbol, a change in the size of a symbol in accordance with the number of articles may be made moderate for a local area such as a Tokyo district including many articles. Further, the size of a symbol in accordance with the number of articles may be adjusted according to the type of a category of an article. For example, a symbol may be small and a change in the size of the symbol in accordance with the number of articles may be moderate for a category of many articles. Further, the size of a symbol in accordance with the number of articles may be adjusted in accordance with the population in a local area to be displayed. For example, a change in the size of a symbol in accordance with the number of articles may be moderate for a local area of much population.

Further, the number of each category in all articles (for example, the rate of articles on sport with respect to the number of all articles) may be displayed for each local area.

[4. Operation of Information Processing System According to Second Embodiment]

Next, an operation of an information processing system 1 according to a second embodiment will be described using FIGS. 23 to 26. In addition, the same or corresponding portions as in the first embodiment will be assigned the same reference numerals, and described. The same applies to other embodiments and modified examples.

Figure 23:
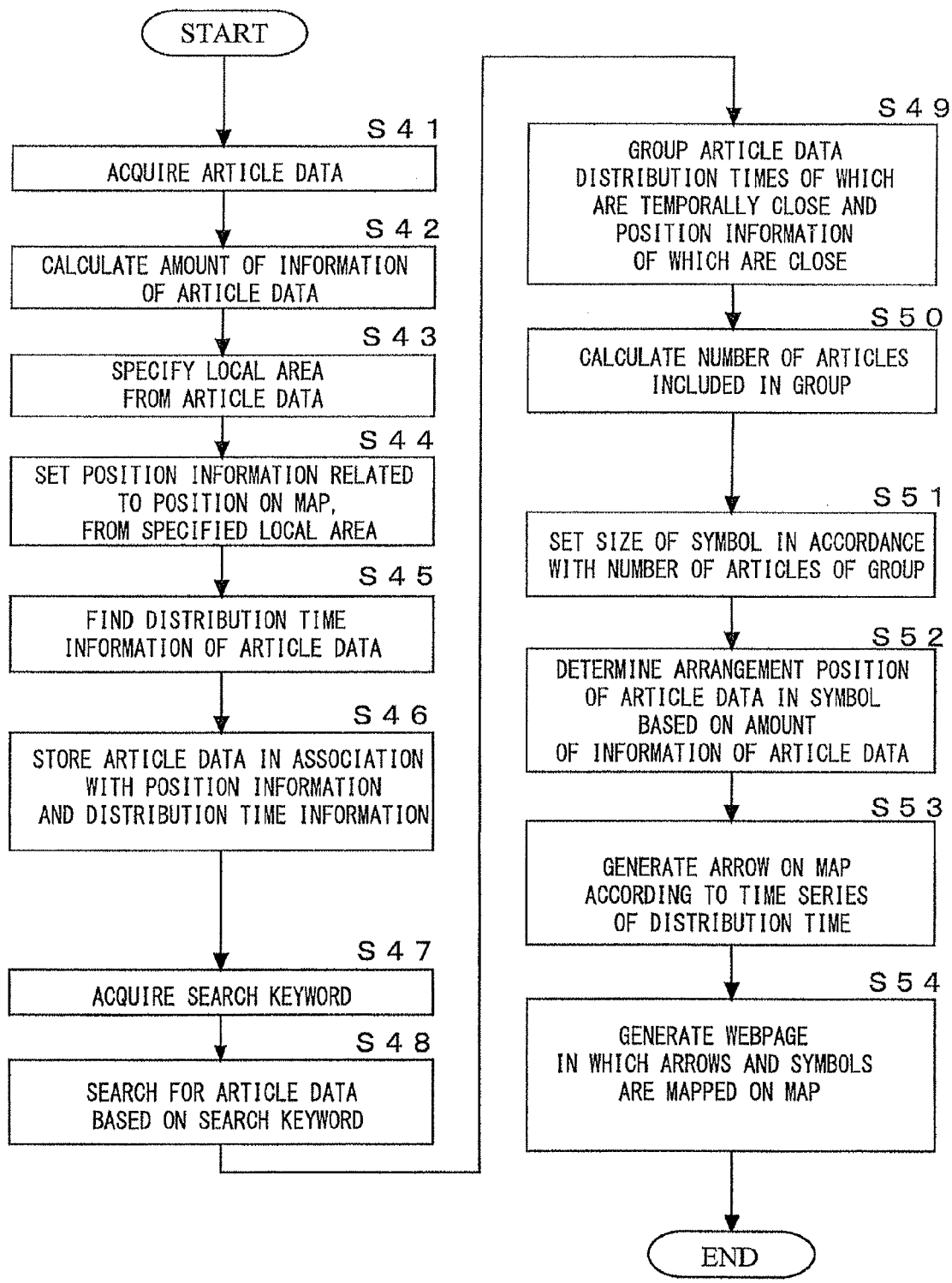
FIG. 23 is a flowchart illustrating an operation example of an information processing server in FIG. 1 in a second embodiment.
Figure 25:
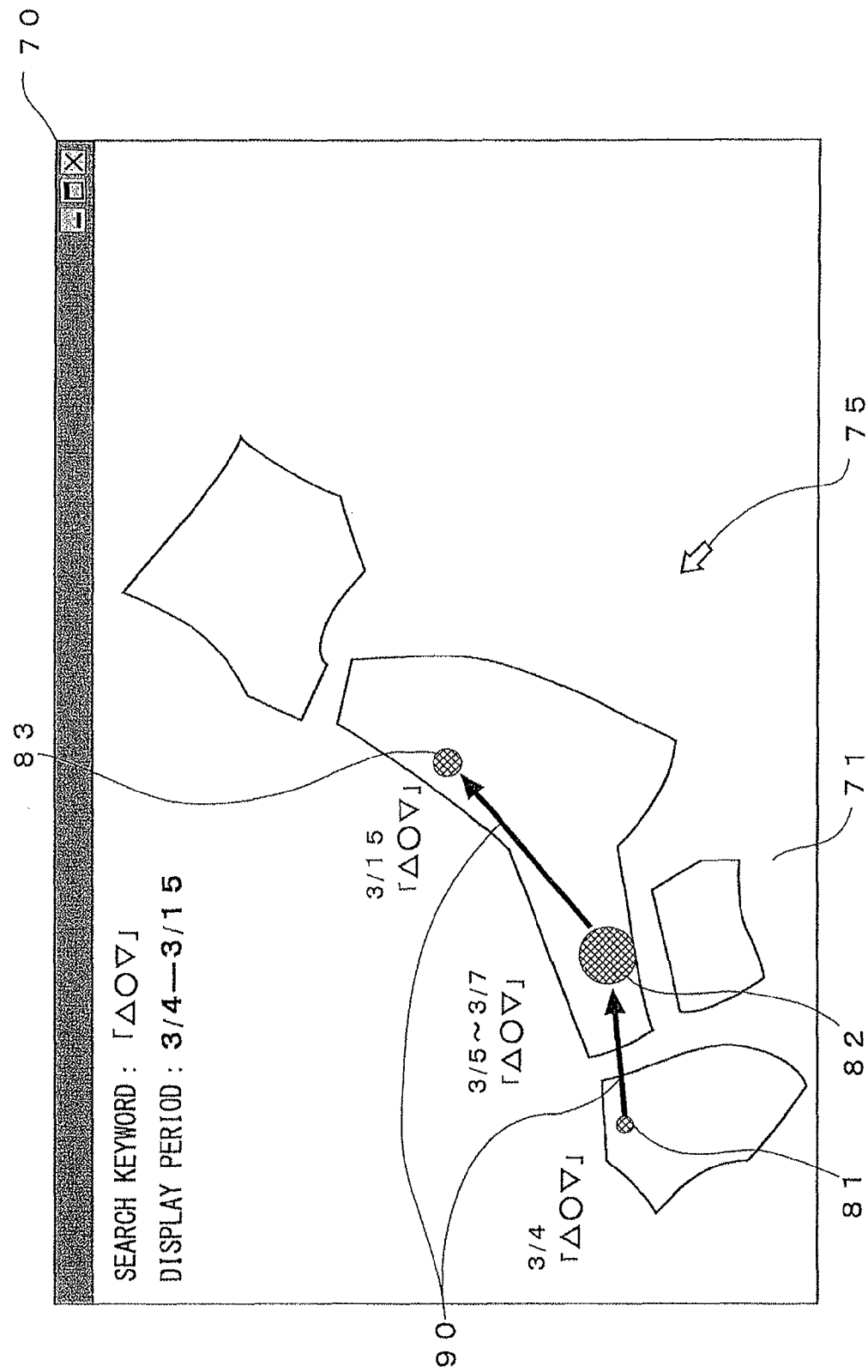
FIG. 25 is a schematic view illustrating an example of a window screen displayed on the terminal in FIG. 1.
Figure 26:
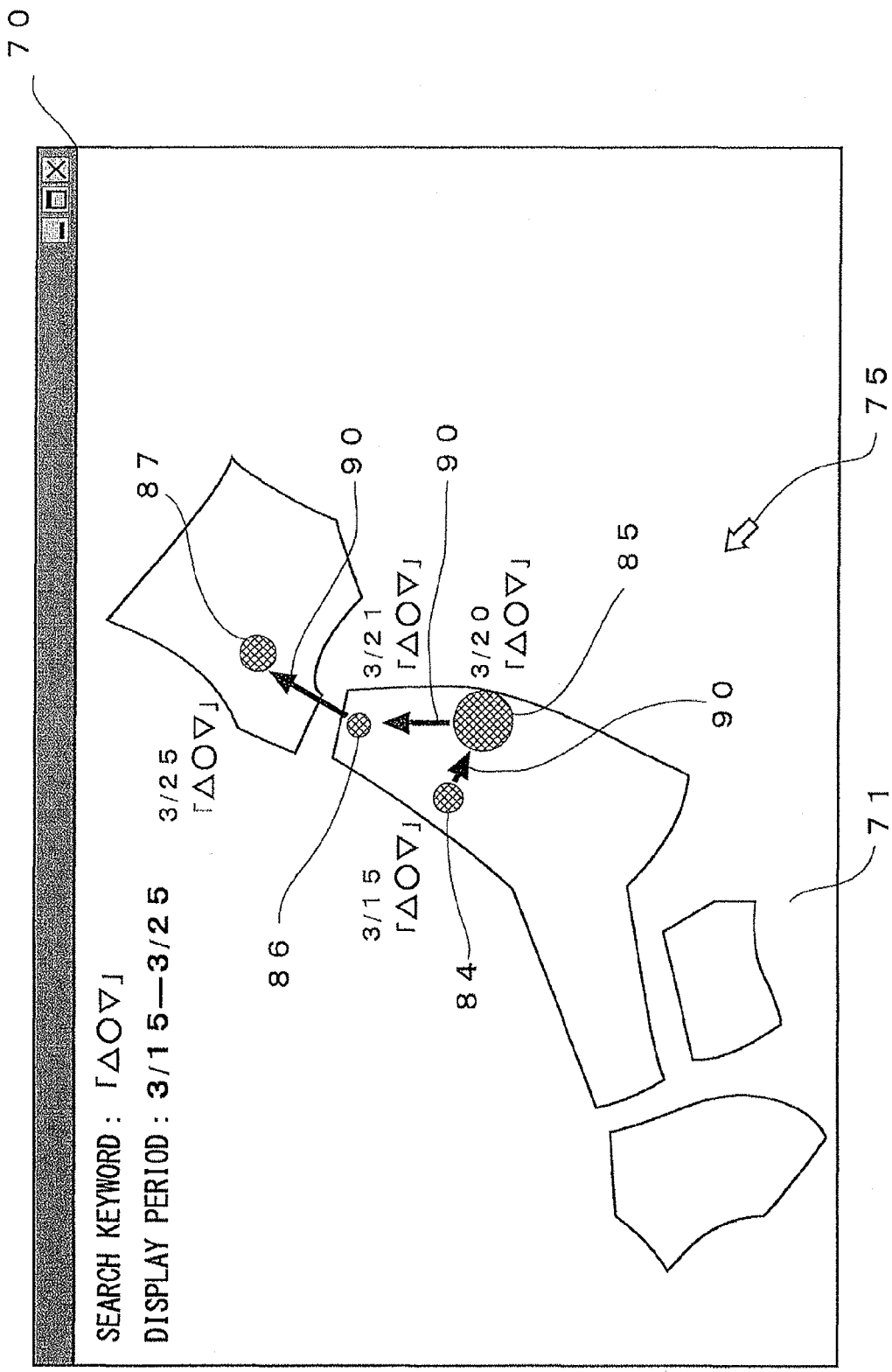
FIG. 26 is a schematic view illustrating an example of a window screen displayed on the terminal in FIG. 1.

FIG. 23 is a flowchart illustrating an operation example of an information processing server 10. FIG. 24 is a schematic view illustrating an example of a table constructed in an article DB 12a of the information processing server 10. FIG. 25 is a schematic view illustrating an example of a window screen displayed on the terminal 30. FIG. 26 is a schematic view illustrating an example of a window screen displayed on the terminal 30.

(4.1 To Store Article Data)

First, an operation of acquiring article data from, for example, a news distribution site 5, and storing, for example, article data in the article data DB 12a in step S41 to step S46 will be described.

First, as illustrated in FIG. 23, the information processing server 10 acquires article data (step S41). More specifically, a system control unit 14 of the information processing server 10 acquires, for example, a sentence of article data as in step S1.

Next, the information processing server 10 calculates, for example, the amount of information of article data (step S42). More specifically, the system control unit 14 of the information processing server 10 calculates the amount of information of article data as in step S14. Further, for example, index information or a snippet are generated by an indexer and stored in the article DB 12a in association with an article ID in order to search for a news article using a search keyword from the terminal 30.

Next, the information processing server 10 specifies a local area from the article data (step S43). More specifically, the system control unit 14 of the information processing server 10 extracts a local area word from the article data as in step S15, and specifies a local area indicating the article data from the extracted local area word as in step S16.

Next, the information processing server 10 sets position information related to a position on a map from the specified local area (step S44). More specifically, the system control unit 14 of the information processing server 10 functions as an example of a position information specifying means to refer to a local area word DB 12b, and set position information related to the position on the map based on longitude/latitude information or a geography code of the specified local area.

Next, the information processing server 10 specifies distribution time information of article data (step S45). More specifically, the system control unit 14 of the information processing server 10 specifies distribution time information of article data based on, for example, a distribution time of an article included in article data or a time when article data is uploaded.

Next, the information processing server 10 stores the article data in association with the specified position information and the specified distribution time information (step S46). For example, the system control unit 14 of the information processing server 10 functions as an example of an article data memory means to store, for example, a geography code of the extracted local area word "ΔΔ ward, Tokyo", the specified distribution time information and the amount of information of article data in the article DB 12a in association with the article ID of the acquired article data.

(4.2 To Search and Group Article Data)

Next, an operation of searching for matching article data based on a search keyword and grouping article data based on position information and distribution time information of the article data in step S47 to step S50 will be described.

First, the information processing server 10 acquires the search keyword (step S47). More specifically, the system control unit 14 of the information processing server 10 receives and acquires a search keyword (for example, "Δ∘∇") input by a user of the terminal 30, from the terminal 30 through a communication unit 11.

Next, the information processing server 10 searches for article data based on the search keyword (step S48). More specifically, the system control unit 14 of the information processing server 10 refers to the article DB 12a, searches for article data matching the search keyword and collects corresponding article data.

Next, the information processing server 10 groups article data distribution times of which are temporally close and positions of which are indicated by position information and are geographically close (step S49). More specifically, the system control unit 14 of the information processing server 10 groups articles which include distribution times when the articles are distributed are close (for example, articles distributed on the same day or articles distributed on consecutive days like March 5 to March 6) and which include geography codes belonging to a predetermined area (an example of an article related to specific position information). Still more specifically, as illustrated in FIG. 24, the system control unit 14 of the information processing server 10 arranges searched article data in order of distribution time information in a table 12*s*, and allocates a group number to article including a geography code belonging to the same area. The system control unit 14 of the information processing server 10 functions as an example of a grouping means that groups article data based on pieces of position information of a plurality of items of article data of different pieces of distribution time information.

Next, the information processing server 10 calculates the number of articles included in a group (step S50). More specifically, as illustrated in FIG. 24, the system control unit 14 of the information processing server 10 functions as an example of an article count calculating means to refer to the table 12*s* constructed in the article DB 12*a*, and calculate the number of articles of the same group number.

(4.3 To Display Article Data)

Next, an operation of generating a webpage (window screen) to be displayed on a display unit 33 of the terminal 30 in step S51 to step S54 will be described.

The information processing server 10 sets the size of a symbol in accordance with article data according to the number of articles in a group (step S51). More specifically, as illustrated in FIG. 25, the system control unit 14 of the information processing server 10 first acquires map information 71 of Japan from a map DB 12*c*. Further, the system control unit 14 of the information processing server 10 refers to the table 12*s* constructed in the article DB 12*a*, and sets the size of each of symbols 81, 82 and 83 to be mapped on the map information 71 of the webpage 70 in accordance with the counted number of articles of each group. In the table 12*s*, the symbol 81 corresponds to "group number: 001", the symbol 82 corresponds to "group number: 002" and the symbol 83 corresponds to "group number: 003". In addition, for example, a color of a symbol may be set according to a category of news to which an article matching a search keyword belongs.

Next, the information processing server 10 determines arrangement positions of article data in the symbols 81, 82 and 83 based on the amount of information of each article data (step S52). The system control unit 14 of the information processing server 10 determines an arrangement position of article data as in step S23.

Next, the information processing server 10 generates an arrow on a map according to time series of a distribution time (step S53). For example, as illustrated in FIG. 25, the system control unit 14 of the information processing server 10 first generates the symbol 81 from an article distributed on March 4. Further, the symbol 82 is generated from articles distributed on March 5 to March 7.

Furthermore, the system control unit 14 generates arrows 90 as an example of visualization information for visual association on the map information 71. Still further, for example, the system control unit 14 of the information processing server 10 calculates position coordinates of the symbol 81 and the symbol 82 on the map information 71, and calculates the lengths and the directions of the arrows 90 based on the calculated coordinates. Moreover, the system control unit 14 of the information processing server 10 calculates the position coordinates of the symbol 82 and the symbol 83 on the map information 71, and calculates the lengths and the directions of the arrows 90 based on the calculated coordinates.

Meanwhile, the positions of, for example, the symbols 81, 82 and 83 on the map information 71 are determined based on position information (for example, longitude/latitude information or a geography code) of each article data corresponding to each of the symbols 81, 82 and 83. For example, positions of, for example, the symbols 81, 82 and 83 are determined as, for example, positions of addresses indicated by geography codes, an average of a position of an address indicated by a geography code of each grouped article data or a predetermined position such as a center portion of an area on the map indicated by a group. Thus, the system control unit 14 of the information processing server 10 functions as an example of a visualization information generating means to determine coordinates of a group of article data of different pieces of information about distribution times when articles are distributed, and which are in group in the webpage 70 from position information of article data in a group. Further, information (arrows 90) for visually associating a positional relationship of a group on the map illustrated in FIG. 25 based on the determined coordinates is generated.

Next, the information processing server 10 generates the webpage 70 in which arrows and symbols are mapped on the map (step S54). More specifically, as illustrated in FIG. 25, the system control unit 14 of the information processing server 10 generates for article data of distribution time information corresponding to a display period the webpage 70 in which the symbols 81, 82 and 83 and the arrows 90 are mapped on the map information 71 of Japan based on position information of each article data corresponding to the symbols 81, 82 and 83. In addition, as illustrated in FIG. 25, in the webpage 70, dates of articles and search keywords "△○∇" are displayed near the symbols 81, 82 and 83.

Further, the system control unit 14 of the information processing server 10 transmits information related to the webpage 70 to the terminal 30 through the communication unit 11 in response to the terminal 30.

Next, the system control unit 36 of the terminal 30 which has received the information related to the webpage 70 through the communication unit 31 makes the display unit 33 display the webpage 70.

Next, as illustrated in FIG. 26, when a display period for displaying article data corresponding to distribution time information in a predetermined time is changed, in step S53, the system control unit 14 of the information processing server 10 generates the webpage 70 in which the symbols 84, 85, 86 and 87 and the arrows 90 are mapped on the map information 71 based on position information of each article data corresponding to each of the symbols 84, 85, 86 and 87. In addition, the symbols 84, 85, 86 and 87 are local areas including the greatest number of articles on a predetermined day. Further, when the numbers of articles on a predetermined day is the same, an area to be displayed may be limited to one local area or a plurality of local areas may be displayed. Furthermore, symbols may be displayed in all areas including articles on a predetermined day. In these cases, a plurality of arrows 90 may be indicated from the same symbol.

As described above, according to the embodiment, by acquiring a search keyword from a terminal, acquiring article data associated with a search keyword, specifying a local area indicated by article data, specifying position information related to a position on a map from the specified local area, setting information about a distribution time when the article data is distributed from the article data, storing the article data in association the set position information and the distribution time information, generating visualization information (for example, the arrows 90) for visually associating on the map the positions on a map indicated by position information of a plurality of items of article data (for example, article data indicated by the symbol 81 and article data indicated by the symbol 82) of different pieces of distribution time information and making the display unit 33 of the terminal 30 display visualization information and the map, it is possible to visualize how information about a news article spreads and propagates, and improve users' convenience. Further, the users can recognize how information propagates, that is, an article related to a search keyword is distributed and moves, on the map of the webpage 70. Furthermore, visualization information enables the users to comprehend how the search keyword (word) spreads, through an article.

Next, a modified example of visualization information will be described using FIGS. 27 to 29.

Figure 27:
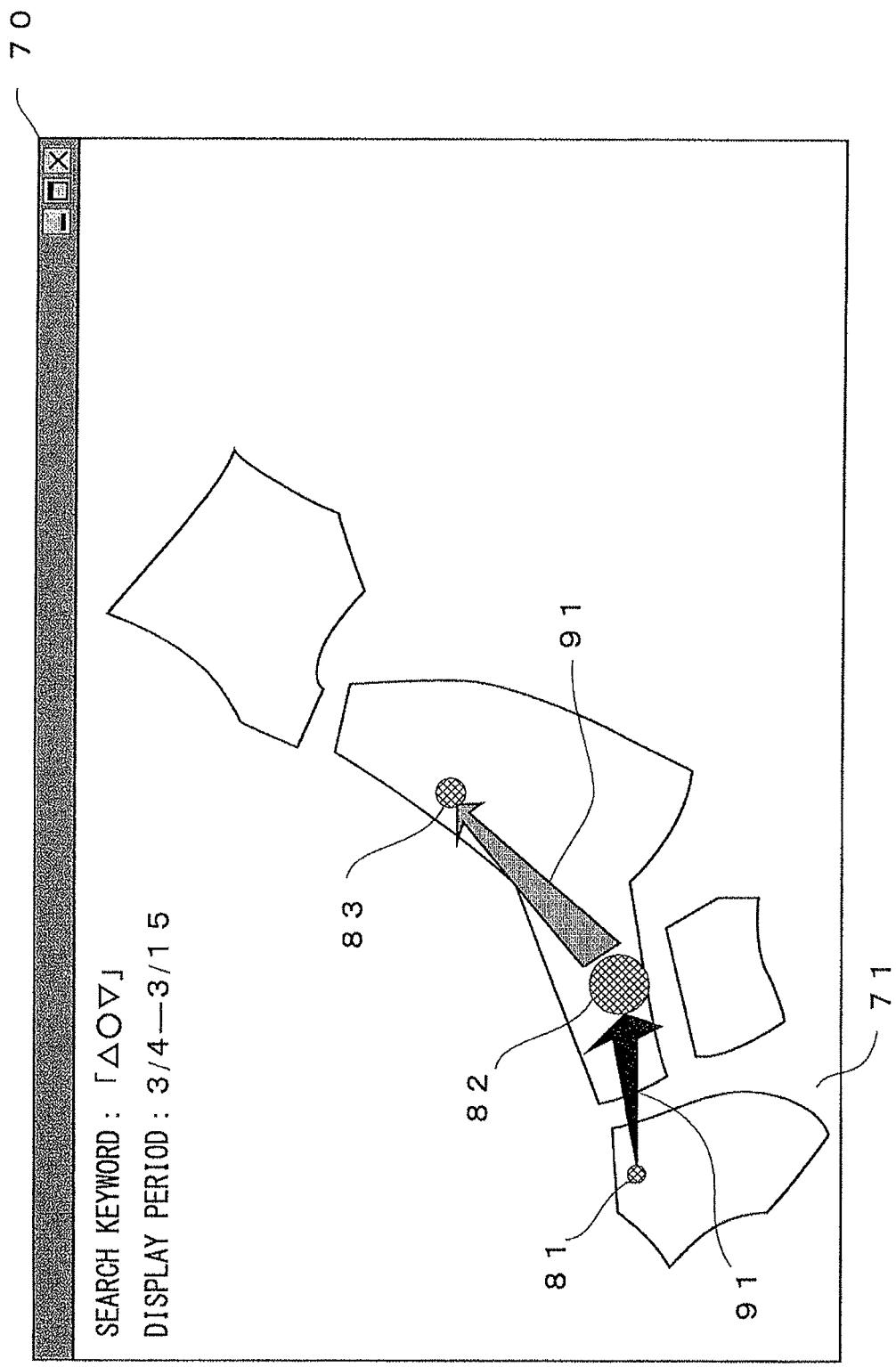
FIG. 27 is a schematic view illustrating a first modified example of visualization information.
Figure 28:
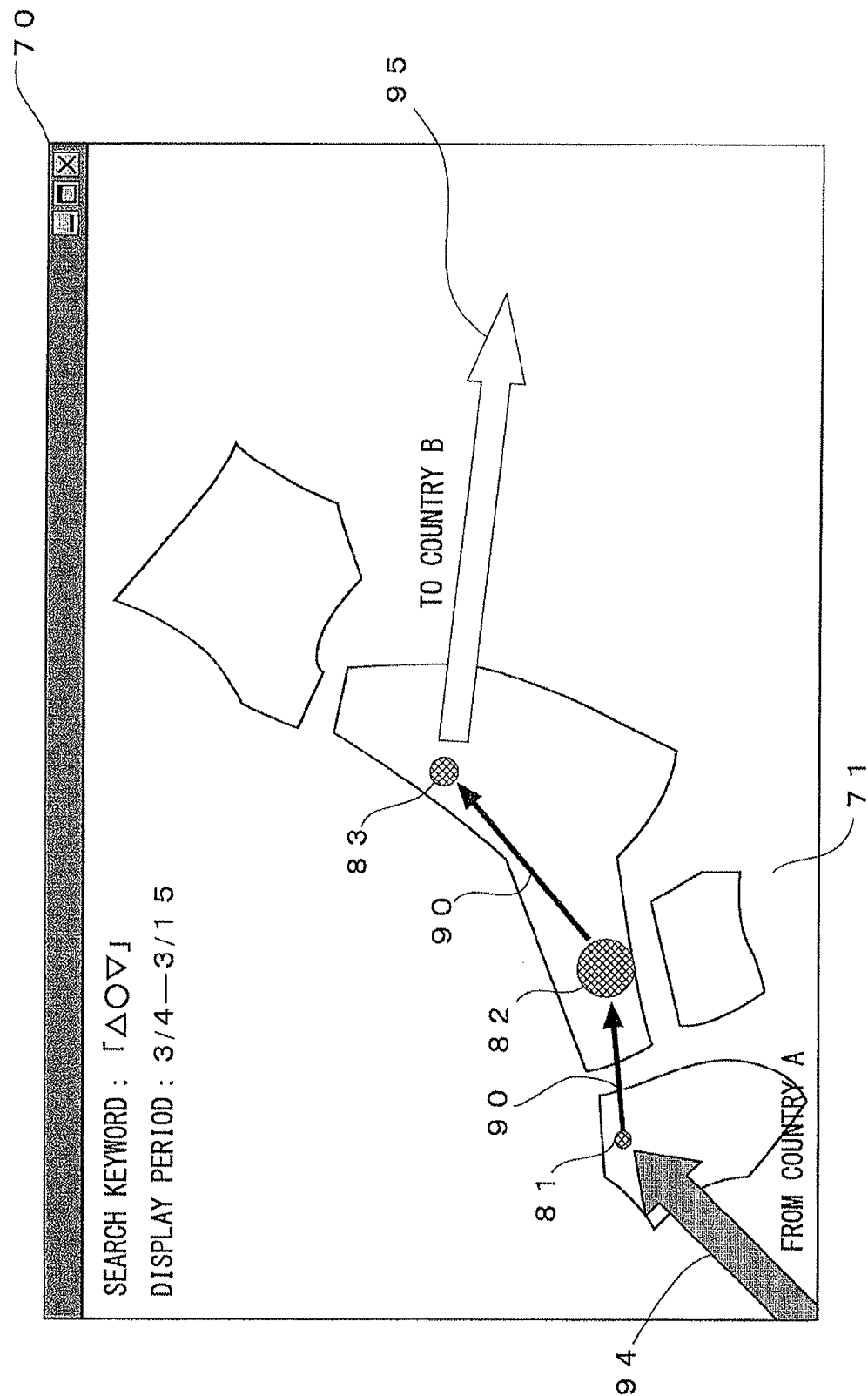
FIG. 28 is a schematic view illustrating a second modified example of visualization information.
Figure 29:
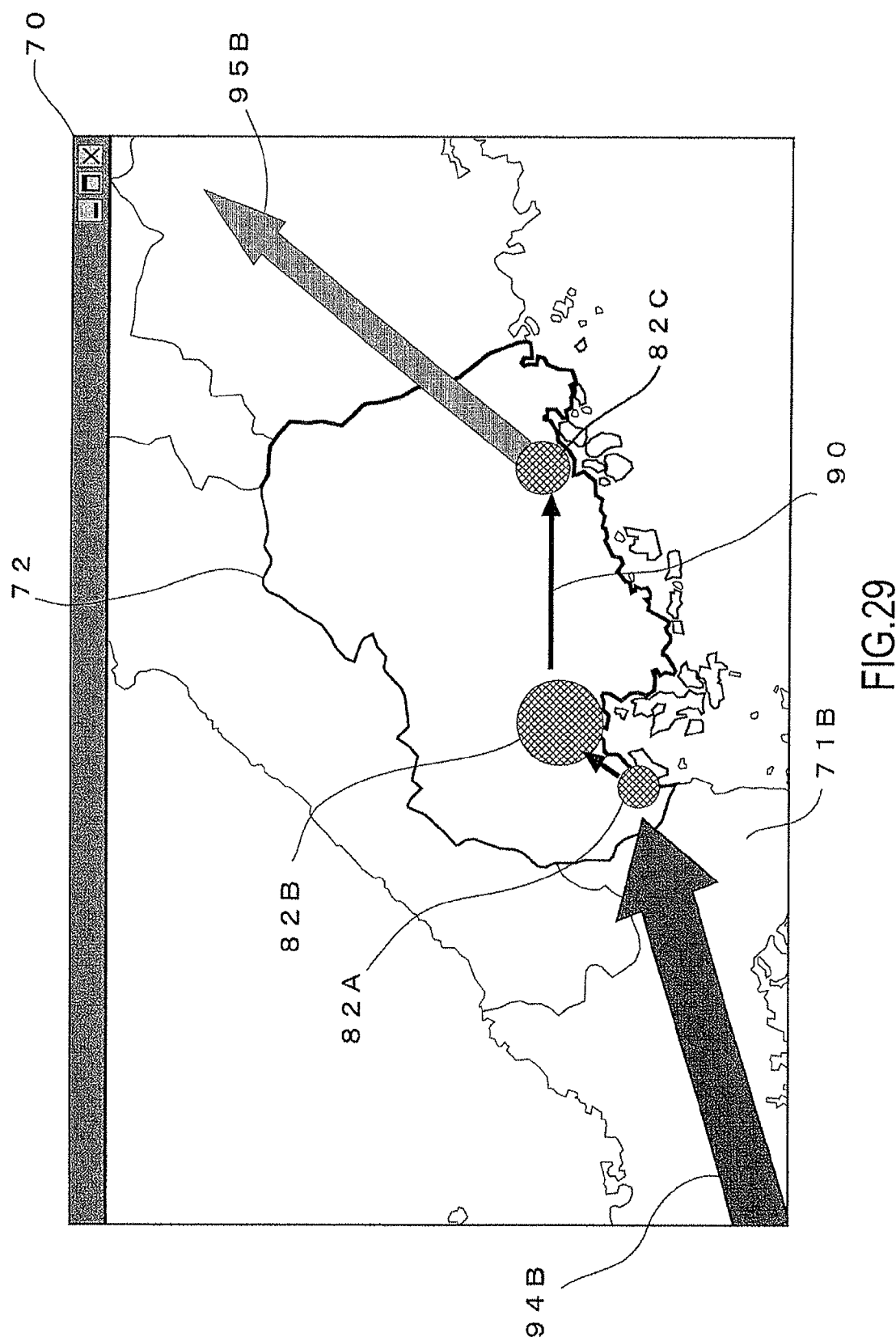
FIG. 29 is a schematic view illustrating a modified example of a window screen displayed on the terminal in FIG. 1.

FIGS. 27 to 29 are schematic views illustrating various modified examples of visualization information (arrows 90).

According to a first modified example of visualization information, as illustrated in FIG. 27, a form of arrows 91 is changed in accordance with sizes of symbols 81 or 82 or the symbols 82 or 83 (corresponding to the number of articles) at both ends of the arrows 91 which are examples of visualization information. When, for example, the arrow 91 goes from the symbol 81 including a small number of articles to the symbol 82 including a great number of articles, the system control unit 14 of the information processing server 10 makes a base end portion side of a line of the arrow 91 thinner and makes a tip portion side of the line of the arrow 91 bolder. Meanwhile, when, for example, the arrow 91 goes from the symbol 82 including a great number of articles to the symbol 83 including a small number of articles, the system control unit 14 of the information processing server 10 makes a base end portion side of the line of the arrow 91 bolder and makes a tip portion side of the line of the arrow 91 thinner. In addition, as illustrated in FIG. 27, for example, colors of the arrows 91 may be changed in accordance with an increase/decrease in the number of articles.

Thus, the system control unit 14 of the information processing server 10 refers to the article DB 12a, calculates the number of articles related to specific position information and sets visualization information such as the arrows 91 based on the number of articles, so that users can easily and intuitively recognize how information spreads. Further, the users can easily recognize what article related to which part of the map appears frequently.

According to a second modified example of visualization information, when an article stays in a given area for a certain period of time such as consecutive days of "March 5 to March 7", forms of arrows are changed in accordance with a duration of stay. For example, the system control unit 14 of the information processing server 10 changes the size of a base end portion of an arrow in accordance with a duration of stay of an article. The duration of stay is determined based on distribution time information of article data of each group. In case of, for example, "group number 002" in the table 12s, the duration of stay of an article is calculated as three days from distribution time information. Further, the system control unit 14 of the information processing server 10 may change the thickness of a line portion of an arrow or the size of a tip portion of the arrow in accordance with the duration of stay of an article.

Thus, the system control unit 14 of the information processing server 10 refers to the table 12s which is an example of an article data memory means, collects article data including position information related to a position belonging to a predetermined area (predetermined range) on a map, and sets visualization information based on distribution time information of the collected article data, so that users can intuitively comprehend how information spreads. Particularly when there is information about an article on consecutive days of "March 5 to March 7" in a given area, some useful information is likely to exist in this area, so that users can visually comprehend uniqueness of the local area in information.

According to a third modified example of visualization information, the second modified example and the third modified example are combined. A base end portion of an arrow which is an example of visualization information corresponds to a base end portion according to the third modified example, and the line portion of the arrow and the tip portion of the arrow correspond to the line portion and the tip portion of the arrow according to the second modified example. In this case, users can easily and intuitively recognize how the amount of information spreads, and comprehend uniqueness of a local area.

According to a fourth modified example of visualization information, as illustrated in FIG. 28, the relevance of information to a place other than the map information 71 of a display frame of a screen of the webpage 70 is indicated. According to this modified example, the relevance to article data of overseas in particular is expressed.

An arrow 94 which is an example of visualization information stretches toward the symbol 81 starting from a place other than the map information 71 including article data which is older than article data of the symbol 81. This arrow 94 enables the users to comprehend a geographical image of an information source. Further, an arrow 95 which is an example of visualization information stretches toward a place other than the map information 71 including article data which is newer than the symbol 83, starting from the symbol 83. This arrow 95 enables users to comprehend a geographical image of the destination of information about an article other than the map information 71.

Further, the arrows 94 and 95 which are examples of visualization information enable users to visually comprehend how information about a news article broadly spreads and propagates.

In addition, when a very important person of a given country visits Japan, the direction of the base end portion of the arrow 94 may indicate a geographical position of the country, or the tip portion of the arrow 95 may indicate a geographical position of the country. In this case, it is possible to indicate a relationship between an article and another country.

According to a fifth modified example of visualization information, visualization information is changed in accordance with the number of times of access to article data, and the number of articles is expressed by, for example, colors of symbols.

The system control unit 14 of the information processing server 10 refers to a member information DB 12b, and calculates the number of times of access to each article data based on a user ID or a log-in ID of a user who is logging in, for example, a shopping site. Further, the system control unit 14 of the information processing server 10 may calculate the number of times of access to each article data using Cookie. In addition, to accurately measure this number of times of access or the number of times each user views each article, the system control unit 14 of the information processing server 10 preferably does not increase the number of times of access when it is decided based on, for example, a user ID that the user is the same.

The size of a base end portion of an arrow which is an example of visualization information may be changed in accordance with the total number of times of access to each article data belonging to "group number: 001". Further, the size of the base end portion of the arrow may be changed in accordance with the total number of times of access to each article data belonging to "group number: 002". Furthermore, the line portion of the arrow on the base end portion may be made thick in accordance with the size of the base end portion. Users can visually comprehend that the number of times of access is great and therefore the number of people who are interested in and reading an article of an area is probably high, and how information propagates.

Further, instead of the size of a symbol corresponding to the number of articles, the number of articles may be expressed by shades or colors similar to the symbols.

Next, a modified example of a window screen displayed on the terminal 30 will be described using FIG. 29.

FIG. 29 is a schematic view illustrating a modified example of a window screen displayed on the terminal 30.

FIG. 29 illustrates that an area 72 in which the symbols 82 are displayed in FIG. 25 is enlarged and displayed. The system control unit 14 of the information processing server 10 groups article data of "group number 002" smaller into subgroups based on a geography code in the table 12s. Symbols 82A, 82B and 82C correspond to subgroups which are grouped smaller, and the system control unit 14 of the information processing sever 10 generates the arrow 90 going from the subgroup of the symbol 82A to the subgroup of the symbol 82B and the arrow 90 going from the subgroup of the symbol 82B to the subgroup of the symbol 82C.

Further, as in the fourth modified example of visualization information, an arrow 94B goes toward the symbol 82A starting from an area of the symbol 81 other than map information 71B, and an arrow 95B goes toward an area of a symbol 73 other than the map information 71 starting from the symbol 82C.

In case of this modified example, when receiving from the terminal 30 a request for enlarging the area 72 in which the symbol 82 is displayed, the system control unit 14 of the information processing server 10 acquires map information about the area 72 in which the symbol 82 is displayed from the map DB 12c. The system control unit 14 of the information processing server 10 functions as a map scale means that sets a scale of a map to be displayed on the display unit 33 of the terminal 30 by receiving from the terminal 30 a request for enlarging or reducing the map and acquiring map information from the map DB 12c.

Next, although, as in step S49, the system control unit 14 of the information processing server 10 groups article data distribution times of which are temporally close and positions of which are indicated by position information and are geographically close, a predetermined area is further narrowed, article data is grouped and subgroups are generated for article data belonging to "group number 002". For example, as illustrated in FIG. 29, subgroups corresponding to the symbols 82A, 82B and 82C are generated. Thus, when the scale of the map is controlled, the system control unit 14 of the information processing server 10 groups grouped article data based on position information again.

Next, as in step S50, the system control unit 14 of the information processing server 10 calculates the number of articles included in the subgroups.

Next, as in step S51, the system control unit 14 of the information processing server 10 sets the sizes of the symbols 82A, 82B and 82C corresponding to article data, based on the number of articles of the subgroups.

Next, as in step S52, the system control unit 14 of the information processing server 10 determines arrangement positions of article data in the symbols 82A, 82B and 82C based on the amount of information of each article data.

Next, as in step S53, the system control unit 14 of the information processing server 10 generates the arrow 90 going from the symbol 82A to the symbol 82B and the arrow 90 going from the symbol 82B to the symbol 82C according to time series of distribution times. In addition, the system control unit 14 of the information processing server 10 may use an average distribution time of article data in the subgroups, and determines the directions of the arrows 90 according to the average distribution time. Thus, the system control unit 14 of the information processing server 10 determines an arrangement of the symbols 82A, 82B and 82C on the map based on the position indicated by position information of grouped article data, and generates the arrows 90 for visually associating the symbols on the map according to the group.

Next, as in step S54, the system control unit 14 of the information processing server 10 generates the webpage 70 in which the arrows and the symbols are mapped on the map the scale of which is changed, based on positions indicated by position information of subgrouped article data.

In case of this modified example, users can comprehend a detailed flow of information as a flow of information toward the symbol 82, that is, from the symbol 82A, the arrow 90, the symbol 82B, the arrow 90 to the symbol 82C, and an entire flow of information like the arrows 94B and 95B.

In addition, the search server 20 which is an example of an external search device which is not provided in a server system 7, through the network 3. Further, the information processing server 10 which is an example of an information processing device may include a search device. That is, the information processing server 10 may have the search DB 22a, and, in place of the search server 20, the information processing server 10 may perform searching using a specified characteristic word and acquire a search result.

Further, the invention is by no means limited to the above embodiments. The above embodiment is an exemplary embodiment, employs substantially the same configuration as a technical idea disclosed in the scope of the claims of the invention, and any configuration is incorporated in a technical scope of the invention as long as the configuration provides the same function and effect.

EXPLANATION OF REFERENCE NUMERALS

3: NETWORK
10: INFORMATION PROCESSING SERVER (INFORMATION PROCESSING DEVICE)
12: MEMORY UNIT
12a: ARTICLE DB (ARTICLE DATA MEMORY MEANS)
12b: LOCAL AREA WORD DB (LOCAL AREA WORD MEMORY MEANS)

12c: MAP DB
12d: USER INFORMATION DB
12e: VISUALIZATION INFORMATION DB
20: SEARCH SERVER (SEARCH DEVICE)
22: MEMORY UNIT
22a: SEARCH DB
22b: WORD ASSOCIATION DB
50, 51, 52, 53: SYMBOL
90, 91, 94, 94B, 95, 95B: ARROW (VISUALIZATION INFORMATION)

The invention claimed is:

1. An information processing device comprising:
at least one memory operable to store program code;
at least one processor operable to read the program code and operate as instructed by the program code, the program code including:
code configured to cause the at least one processor to store, in a local area word memory, a local area word indicating a local area in association with geography information for specifying the local area;
article data acquiring code configured to cause the at least one processor to acquire article data;
characteristic word extracting code configured to cause the at least one processor to extract characteristic words from text of the article data;
determining code configured to cause the at least one processor to, by comparing the characteristic word and each of the local area word stored in the local area word memory, determine whether or not the characteristic word matches any of the local area word;
search result code configured to cause the at least one processor to request a search device to perform a web search by using the characteristic word as a keyword and acquire a search result from the search device, the characteristic word being determined not to match any of the local area word;
local area specifying code configured to cause the at least one processor to specify a local area related to the article data based on the search result acquired by the search result code, and locate geography information;
article content specifying code configured to cause the at least one processor to match article content of the article data and a predetermined keyword, and specify the article content of the article data as at least one of the predetermined keyword;
code configured to cause the at least one processor to store, in an article data memory, the article data in association with at least one of the predetermined keyword and the specified local area;
mapping code configured to cause the at least one processor to map a symbol corresponding to the article data on a map based on the specified local area; and
relevant article collecting code configured to cause the at least one processor to refer to the article data memory, and collect information about articles related to the specified local area and the specified article content, wherein:
the local area specifying code causes the at least one processor to store the specified characteristic word in the local area word memory as the local area word in association with the specified local area;
the mapping code causes the at least one processor to map symbols in accordance with a number of the collected articles;
the search result code causes the at least one processor to search for a plurality of related words around the specified characteristic word; and
the local area specifying code causes the at least one processor to specify the local area from the related words, and locate the geography information.

2. The information processing device according to claim 1,
wherein the mapping code causes the at least one processor to determine an arrangement position of the article data in the symbol in accordance with an amount of information of the article data.

3. The information processing device according to claim 1, wherein:
the article content specifying code causes the at least one processor to specify a category of the article content; and
the mapping code causes the at least one processor to change a mode of the symbol per category.

4. The information processing device according to claim 1, further comprising:
distribution time information specifying code configured to cause the at least one processor to specify information about a distribution time at which the article data is distributed, from the article data, wherein
the article data acquiring code causes the at least one processor to acquire article data related to a search keyword, and
the mapping code causes the at least one processor to map visualization information for visually associating, on a map, symbols corresponding to a plurality of items of article data of different pieces of distribution time information in article data related to the search keyword.

5. The information processing device according to claim 1, wherein:
the characteristic word extracting code causes the at least one processor to extract a search result characteristic word from the search result acquired by the search result code; and
the local area specifying code causes the at least one processor to refer to the local area memory, specify the local area from the search result characteristic word, and locate the geography information.

6. The information processing device according to claim 1, wherein:
the local area specifying code causes the at least one processor to calculate an appearance frequency of the characteristic word extracted from the article data, specify the local area based on the calculated appearance frequency and locate the geography information.

7. The information processing device according to claim 6, wherein:
the local area word memory includes a weighting value per local area word; and
the local area specifying code causes the at least one processor to specify the local area based on the calculated appearance frequency and the weighting value, and locate the geography information.

8. The information processing device according to claim 1, wherein:
the local area specifying code causes the at least one processor to specify the plurality of related word using a distance between a numbers of characters between characteristic words in the article data.

9. An information processing method of processing information in an information processing device comprising:

a local area word memory step of associating and storing a local area word indicating a local area, and geography information for specifying the local area, in a local area word memory;

an article data acquiring step of acquiring article data;

a characteristic word extracting step of extracting characteristic words from text of the article data;

a determining step of comparing the characteristic word and each of the local area word stored in the local area word memory and determining whether the characteristic word matches any of the local area word;

a search result step of requesting a search device to perform a web search by using the characteristic word as a keyword and acquiring a search result, the characteristic word being determined not to match any of the local area word;

a local area specifying step of specifying a local area related to the article data based on the search result of the search result step, and locating geography information;

an article content specifying step of matching article content of the article data and a predetermined keyword, and specifying the article content of the article data as at least one of the predetermined keyword;

an article data memory step of storing the article data in an article data memory in association with at least one of the predetermined keyword and the specified local area;

a mapping step of mapping a symbol corresponding to the article data on a map based on the specified local area; and a relevant article collecting step of referring to the article data memory, and collecting information about articles related to the specified local area and the specified article content, wherein:

in the local area specifying step, the specified characteristic word is stored in the local area word memory as the local area word in association with the specified local area;

in the mapping step, symbols in accordance with a number of collected articles are mapped;

in the search result step, a plurality of related words around the specified characteristic word are searched; and in the local area specifying step, the local area is specified from the related words, and the geography information is located.

10. A non-transitory computer-readable recording medium recording an information processing program causing a computer to:

store, in a local area word memory, a local area word indicating a local area in association with geography information for specifying the local area;

acquire article data;

extract characteristic words from text of the article data;

determine, by comparing the characteristic word and each of the local area word stored in the local area word memory, whether or not the characteristic word matches any of the local area word;

request a search device to perform a web search by using the characteristic word as a keyword and acquire a search result, the characteristic word being determined not to match any of the local area word;

specify a local area related to the article data based on the search result from the search device, and locate geography information;

match article content of the article data and a predetermined keyword, and specify the article content of the article data as at least one of the predetermined keyword;

store, in an article data memory, the article data in association with at least one of the predetermined keyword and the specified local area;

map a symbol corresponding to the article data on a map based on the specified local area; and refer to the article data memory, and collect information about articles related to the specified local area and the specified article content, wherein:

the specified characteristic word is stored in the local area word memory as the local area word in association with the specified local area;

symbols are mapped in accordance with a number of the collected articles;

a plurality of related words around the specified characteristic word are searched; and the local area is specified from the related words, and the geography information is located.

* * * * *